US012461364B2

(12) United States Patent
Browy et al.

(10) Patent No.: US 12,461,364 B2
(45) Date of Patent: Nov. 4, 2025

(54) MULTI-DEPTH EXIT PUPIL EXPANDER

(71) Applicant: MAGIC LEAP, INC., Plantation, FL (US)

(72) Inventors: Eric C. Browy, Meridian, ID (US); Derek Michael Geiger, Miami, FL (US)

(73) Assignee: Magic Leap, Inc., Plantation, FL (US)

(*) Notice: Subject to any disclaimer, the term of this patent is extended or adjusted under 35 U.S.C. 154(b) by 255 days.

(21) Appl. No.: 18/303,473

(22) Filed: Apr. 19, 2023

(65) Prior Publication Data
US 2023/0258928 A1 Aug. 17, 2023

Related U.S. Application Data

(63) Continuation of application No. 17/588,783, filed on Jan. 31, 2022, now Pat. No. 11,662,575, which is a
(Continued)

(51) Int. Cl.
G02B 27/00 (2006.01)
G02B 27/01 (2006.01)
(Continued)

(52) U.S. Cl.
CPC ..... *G02B 27/0081* (2013.01); *G02B 27/0172* (2013.01); *G02B 27/286* (2013.01);
(Continued)

(58) Field of Classification Search
CPC ............ G02B 27/0081; G02B 27/0172; G02B 27/286; G02B 27/288; G02B 27/4205; G02B 2027/0123; G02B 2027/0138; G02B 2027/0174; G02B 2027/0178; G02B 2027/012; G02B 5/30; G02B 2027/0127; G02B 2027/0187; G02B 27/01;
(Continued)

(56) References Cited

U.S. PATENT DOCUMENTS 7,758,185 B2 7/2010 Lewis
8,353,594 B2 1/2013 Lewis
(Continued)

OTHER PUBLICATIONS

Azuma, "A Survey of Augmented Reality," Presence: Teleoperators and Virtual Environments, Aug. 1997, 6(4):355-385.
(Continued)

*Primary Examiner* — Henry Duong
(74) *Attorney, Agent, or Firm* — Fish & Richardson P.C.

(57) ABSTRACT

An example head-mounted display device includes a light projector and an eyepiece. The eyepiece includes a light guiding layer and a first focusing optical element. The first focusing optical element includes a first region having a first optical power, and a second region having a second optical power different from the first optical power. The light guiding layer is configured to: i) receive light from the light projector, ii) direct at least a first portion of the light to a user's eye through the first region to present a first virtual image to the user at a first focal distance, and iii) direct at least a second portion of the light to the user's eye through the second region to present a second virtual image to the user at a second focal distance.

19 Claims, 19 Drawing Sheets

Related U.S. Application Data continuation of application No. 16/678,634, filed on Nov. 8, 2019, now Pat. No. 11,269,180.

(60) Provisional application No. 62/759,970, filed on Nov. 12, 2018.

(51) Int. Cl.
    *G02B 27/28*     (2006.01)
    *G02B 27/42*     (2006.01)
    *G06F 3/01*     (2006.01)

(52) U.S. Cl.
    CPC ....... *G02B 27/288* (2013.01); *G02B 27/4205* (2013.01); *G06F 3/013* (2013.01); *G02B 2027/0123* (2013.01); *G02B 2027/0138* (2013.01); *G02B 2027/0174* (2013.01); *G02B 2027/0178* (2013.01)

(58) Field of Classification Search
    CPC ............ G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/0121; G02B 2027/0125; G02B 2027/0129; G02B 2027/013; G02B 2027/0132; G02B 2027/0134; G02B 2027/0136; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0181; G02B 2027/0183; G02B 2027/0185; G02B 2027/019; G02B 2027/0192; G02B 2027/0194; G02B 2027/0196; G02B 2027/0198; G06F 3/013; G06F 3/012; G06F 3/011
    USPC ......................................................... 359/630
See application file for complete search history.

(56) References Cited

U.S. PATENT DOCUMENTS

| | | | |
|---|---|---|---|
| 8,696,113 B2 | 4/2014 | Lewis | |
| 8,733,927 B1 | 5/2014 | Lewis | |
| 8,733,928 B1 | 5/2014 | Lewis | |
| 9,010,929 B2 | 4/2015 | Lewis | |
| 9,235,064 B2 | 1/2016 | Lewis | |
| 9,239,473 B2 | 1/2016 | Lewis | |
| 9,244,293 B2 | 1/2016 | Lewis | |
| 9,417,452 B2 | 8/2016 | Schowengerdt et al. | |
| 9,658,473 B2 | 5/2017 | Lewis | |
| 9,671,566 B2 | 6/2017 | Abovitz et al. | |
| 10,151,937 B2 | 12/2018 | Lewis | |
| 10,185,147 B2 | 1/2019 | Lewis | |
| 10,262,462 B2 | 4/2019 | Miller et al. | |
| 10,901,291 B1 * | 1/2021 | Sulai ................. | H04N 13/383 |
| 11,269,180 B2 | 3/2022 | Browy et al. | |
| 2017/0007182 A1 | 1/2017 | Samec et al. | |
| 2017/0053450 A1 * | 2/2017 | Rodriguez .......... | G02B 27/017 |
| 2018/0210146 A1 | 7/2018 | Klug et al. | |
| 2018/0217377 A1 | 8/2018 | Lam | |
| 2018/0239177 A1 | 8/2018 | Oh | |
| 2018/0252925 A1 | 9/2018 | Schowengerdt | |
| 2020/0150424 A1 | 5/2020 | Browy et al. | |
| 2021/0042879 A1 * | 2/2021 | Karasawa ............. | G06F 3/013 |

OTHER PUBLICATIONS

Azuma, "Predictive tracking for augmented reality," Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.
Jacob, "Eye Tracking in Advanced Interface Design," Virtual environments and advanced interface design, 1995, 258:288, 50 pages.
PCT International Search Report and Written Opinion in International Application No. PCT/US2019/060565, dated Jan. 30, 2020, 7 pages.
Tanriverdi et al., "Interacting with Eye Movements in Virtual Environments," Proc. of the SIGCHI Conference on Human Factors in Computing Systems, 2000, pp. 265-272.

\* cited by examiner

MULTI-DEPTH EXIT PUPIL EXPANDER

CROSS-REFERENCE TO RELATED APPLICATIONS

This application is a continuation of U.S. application Ser. No. 17/588,783, filed on Jan. 31, 2022, which is a continuation of U.S. application Ser. No. 16/678,634, filed on Nov. 18, 2019, now U.S. Pat. No. 11,269,180, which claims the benefit of the filing date of U.S. Provisional Application No. 62/759,970, filed on Nov. 12, 2018. The contents of U.S. Application Nos. 62/759,970, 16/678,634 and Ser. No. 17/588,783 are incorporated herein by reference in their entirety.

INCORPORATION BY REFERENCE

This application incorporates by reference the entirety of each of the following patent applications: U.S. Provisional Application No. 62/439,848, filed Dec. 28, 2016; U.S. application Ser. No. 14/555,585 filed on Nov. 27, 2014, now U.S. Pat. No. 9,791,700; U.S. application Ser. No. 14/690,401 filed on Apr. 18, 2015, now U.S. Pat. No. 10,262,462; U.S. application Ser. No. 14/212,961 filed on Mar. 14, 2014, now U.S. Pat. No. 9,417,452; U.S. application Ser. No. 14/331,218 filed on Jul. 14, 2014, now U.S. Pat. No. 9,671,566; and U.S. application Ser. No. 15/072,290 filed on Mar. 16, 2016, now U.S. Pat. No. 11,156,835.

BACKGROUND

Field

The present disclosure relates to optical devices, including virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

In an aspect, a head-mounted display device includes a light project and an eyepiece optically coupled to the light projector. The eyepiece defines a usable aperture of the head-mounted display device for an eye of a user of the head-mounted display device through which the user can view the user's environment and virtual images generated by the head-mounted display device overlaid with the user's environment during operation of the head-mounted display device. The eyepiece includes a light guiding layer and a first focusing optical element arranged between the light guiding layer and a user side of the eyepiece. The first focusing optical element comprises a first region having a first optical power arranged between a first region of the light guiding layer and the user side of the eyepiece, and a second region having a second optical power different from the first optical power. The second region of the first focusing optical element is arranged between a second region of the light guiding layer and the user side of the eyepiece. The light guiding layer is configured to: i) receive light from the light projector, ii) direct at least a first portion of the light to the user's eye through the first region of the first focusing optical element to present a first virtual image to the user at a first focal distance, and iii) direct at least a second portion of the light to the user's eye through the second region of the first focusing optical element to present a second virtual image to the user at a second focal distance different from the first focal distance.

Implementations of this aspect can include one or more of the following features.

In some implementations, the first focusing optical element can include at least one of a diffractive or holographic optical element.

In some implementations, the first focusing optical element can include at least one of an analog surface relief grating (ASR), a binary surface relief structure (BSR), or a switchable diffractive optical element.

In some implementations, the first focusing optical element can include a third region arranged between the first region and the second region of the first focusing optical element. An optical power of the third region can continuously transition from the first optical power to the second optical power in a direction from the first region to the second region of the first focusing optical element.

In some implementations, the first region and the second region of the first focusing optical element can be separated by a boundary. A first optical power can discretely transition to the second optical power across the boundary.

In some implementations, at least one of the first optical power or the second optical power can be negative.

In some implementations, at least one of the first optical power or the second optical power can be positive.

In some implementations, at least one of the first optical power or the second optical power can be zero.

In some implementations, the first optical power can be positive, and the second optical power can be zero or negative.

In some implementations, the eyepiece can include a second focusing optical element. The second focusing optical element can include a third region having a third optical power arranged between the first region of the light guiding layer and the user side of the eyepiece, and a fourth region having a fourth optical power different from the third optical power. The fourth region of the second optical element can be arranged between the second region of the light guiding layer and the user side of the eyepiece. The light guiding layer can be configured to direct at least a third portion of the light to the user's eye through the third region of the second optical element to present a third virtual image to the user at a third focal distance, and direct at least a fourth portion of the light to the user's eye through the fourth region of the second optical element to present a fourth virtual image to the user at a fourth focal distance different from the third focal distance.

In some implementations, the first focusing optical element and the second optical element can be aligned such that first region of the first focusing optical element at least partially overlaps with the third region of the second optical element.

In some implementations, the first focusing optical element and the second optical element can be aligned such that second region of the first focusing optical element at least partially overlaps with the fourth region of the second optical element.

In some implementations, the light projector can include a polarization modulator. The polarization modulator can be configured to modulate the first portion of the light according to a first polarity, modulate the second portion of the light according to a second polarity different from the first polarity, and provide the first and the second portions of the light to the light guiding layer.

In some implementations, the eyepiece can include a first polarizing filter and a second polarizing filter. The first polarizing filter can be configured to prevent at least some of the second portion of the light from being emitted from the first region of first focusing optical element. The second polarizing filter can be configured to prevent at least some of the first portion of the light from being emitted from the second region of first focusing optical element.

In some implementations, the light projector can include a time division multiplexer, a first shutter, and a second shutter. The polarization modulator can be configured to operate the first and the second shutters to permit the first portion of the light to be emitted from the first region of the first focusing optical element at a first time, and operate the first and the second shutters to permit the second portion of the light to be emitted from the second region of the first focusing optical element at a second time different from the first time.

In some implementations, at least one of the first shutter or the second shutter can include a liquid crystal shutter.

In some implementations, the head-mounted display device can further include a camera. The camera can be configured to determine a gaze direction of the user. The light projector can be configured to provide the first portion of the light to the light guiding layer responsive to a determination that the gaze direction of the user is a first direction. The light projector can be configured to provide the second portion of the light to the light guiding layer responsive to a determination that the gaze direction of the user is a second direction different from the first direction.

In some implementations, the head-mounted display device can further include a sensor module. The sensor module can be configured to determine a head pose orientation of the user. The light projector can be configured to provide the first portion of the light to the light guiding layer responsive to a determination that the head pose orientation of the user is a first orientation. The light projector can be configured to provide the second portion of the light to the light guiding layer responsive to a determination that the head pose orientation of the user is a second orientation different from the first orientation.

In some implementations, the eyepiece can further include a complementary optical element. The complementary optical element can include a third region having a third optical power, and a fourth region having a fourth optical power. The third optical power can be an inverse of the first optical power, and the fourth optical power can be an inverse of the second optical power.

In some implementations, the complementary optical element can be configured to receive ambient light from the user's environment, direct at least a first portion of the ambient to the user's eye through the third region of the complementary optical element and the first region of the first focusing optical element, and direct at least a second portion of the ambient light to the user's eye through the fourth region of the complementary optical element and the second region of the first focusing optical element.

In some implementations, the ambient light can include light from an object positioned in the user's environment.

In another aspect, an eyepiece of a head-mounted display includes a waveguide, at least one out-coupling optical element, and at least one optical element. The waveguide has a front face, a rear face and a plurality of edges. The front face and the rear face have lateral dimensions. The edges have a thickness less than the lateral dimensions of the front face and the rear face such that the waveguide can guide light therein from a location closer to one edge toward a location closer to another edge by total internal reflection from the front and rear faces. The at least one out-coupling optical element is configured to receive light guided within the waveguide by total internal reflection from the front face and the rear face and to out-couple light out of the front face of the waveguide. The at least one optical element has optical power such that the eyepiece outputs a first portion of the light guided within the waveguide from a first region of the eyepiece as if the light originated from a first depth with respect to the waveguide and a second portion of light guided within the waveguide from a second region of the eyepiece as if the light originated from a second depth with respect to the waveguide. The second region is laterally displaced with respect to the first region.

Implementations of this aspect can include one or more of the following features.

In some implementations, the at least one optical element having optical power can be included in the at least one out-coupling element.

In some implementations, the at least one out-coupling optical element can include a first region configured to out-couple light guided within the waveguide as if the light originated from a first depth with respect to the waveguide and a second region configured to out-couple light guided within the waveguide as if the light originated from a second depth with respect to the waveguide. The first region of the out-coupling optical element can correspond to the first region of the eyepiece and the second region of the outcoupling optical element can correspond to the second region of the eyepiece.

In some implementations, the at least one out-coupling optical element can include a diffractive or holographic optical element.

In some implementations, the at least one optical element having optical power can include a diffractive or holographic optical element.

In some implementations, the diffractive or holographic optical element can include an analog surface relief grating (ASR), a binary surface relief structure (BSR), or a switchable diffractive optical element.

In some implementations, the at least one optical element having optical power can be disposed on the at least one out-coupling element.

In some implementations, the at least one optical element having optical power can include a refracting surface that has optical power.

In some implementations, the at least one optical element having optical power can include a diffractive or holographic optical element.

In some implementations, the eyepiece can further include an in-coupling optical element configured to in-couple light into the waveguide.

In some implementations, the in-coupling optical element can include a wavelength selective optical element configured to couple more light of a first visible wavelength into the waveguide to be guided therein than a second visible wavelength.

In some implementations, the in-coupling optical element can include a diffractive optical element.

In some implementations, the in-coupling optical element can include a refractive lens.

In some implementations, the eyepiece can further include a light distributing element configured to receive light from the in-coupling optical element and redirect the light toward the at least one out-coupling optical element.

In some implementations, the eyepiece can further include a display configured to provide light for injection into the waveguide.

In some implementations, the display can include a fiber scanning display.

In some implementations, at least one of the first region and the second region of the eyepiece can have a fixed optical power.

In some implementations, the eyepiece can further include a multiplexing system configured to selectively distribute a first portion of image content through the first region of the eyepiece and a second portion of the image content through the second region of the eyepiece.

In some implementations, the eyepiece can be included in a head mounted display to be worn on the head of a wearer having a field of view that includes the eyepiece and objects forward the eyepiece. The first portion of the image content can include image content to be presented in the portion of the field of view of the wearer coinciding with the first region of the eyepiece while the second portion of the image content can include image content to be presented in the portion of the field of view of the wearer coinciding with the second region of the eyepiece.

In some implementations, the image content in the first portion of the image content is not visible to the wearer in the portion of the field of view of the wearer coinciding with the second region of the eyepiece while the image content in the second portion of the image content is not visible to the wearer in the portion of the field of view of the wearer coinciding with the first region of the eyepiece.

In some implementations, the first region of the eyepiece can be forward and central of a wearer's eye while the second region of the eyepiece can be below the first region, and the image content presented through the first region of the eyepiece can correspond to far image content while the image content presented through the second region of the eyepiece can correspond to near image content.

In some implementations, the multiplexing system can include a polarization modulator and respective first and second polarization filters associated with respective first and second regions of the eyepiece.

In some implementations, the multiplexing system can be configured to present a first portion of the image content through the first region of the eyepiece while blocking the first portion of the image content from exiting the second region of the eyepiece.

In some implementations, the multiplexing system can be configured to present a second portion of the image content through the second region of the eyepiece while blocking the second portion of the image content from exiting the first region of the eyepiece.

In some implementations, the multiplexing system can be configured to present a first portion of the image content corresponding to first far image content through the first region of the eyepiece while blocking the first portion of the image content from exiting the second region of the eyepiece.

In some implementations, the multiplexing system can be configured to present a second portion of the image content corresponding to second near image content through the second region of the eyepiece while blocking the second portion of the image content from exiting the first region of the eyepiece.

In some implementations, the polarization modulator can include a liquid crystal modulator including a liquid crystal layer disposed between electrodes configured to apply a voltage across the liquid crystal layer so as to cause linearly polarized light to rotate polarization angle.

In some implementations, the multiplexer system can include first and second shutters and the eyepiece can be configured to present far image content through the first region of the eyepiece while blocking the second region of the eyepiece with the second shutter and present near image content through the second region of the eyepiece at a different time while blocking the first region of the eyepiece with the first shutter.

In some implementations, the shutters each can include liquid crystal layers disposed between electrodes arranged to apply a voltage across the liquid crystal layers.

In some implementations, the liquid crystal shutters can further include a polarizer and an analyzer.

In some implementations, the polarizer can be configured to provide linearly polarized light that is received by the liquid crystal layer and the liquid crystal layer can be configured to rotate the polarization angle of the linear polarized light depending on the voltage applied to the liquid crystal layer via the electrodes such that the linear polarization of the light may be made to be parallel or perpendicular to the linear polarization state that is transmitted by the analyzer.

In some implementations, when distant image content is to be displayed, the two shutters may be set such that the distant image content is passed through the first region of the eyepiece while the distant image content from the second region of the eyepiece is blocked while when near image content is being displayed, the two shutters may be set such that the near image content is passed through the second region of the eyepiece while the near image content from the first region of the eyepiece is blocked.

In some implementations, the eyepiece can be included in a head mounted display to be worn on the head of a wearer having a field of view that includes the eyepiece and objects forward the eyepiece, and the shutters can be configured such that light from objects forward of the wearer and the head mounted display may pass through the eyepiece to the wearer's eye regardless of whether the shutters are open or closed.

In some implementations, the eyepiece can be included in a head mounted display to be worn on the head of a wearer having a field of view that includes the eyepiece and objects forward the eyepiece, and the shutters can be configured such that light from objects forward of the wearer and the head mounted display may pass through the analyzer regardless of whether the liquid crystal layer rotates linearly polarized light or not.

In some implementations, the shutters can further include an analyzer but not a polarizer in the optical path between the liquid crystal layer and objects forward the head mounted display.

In some implementations, the shutter can be configured to be selectively opened and closed to allow light from a display to pass or be blocked, the display providing image content.

In some implementations, the eyepiece can further include a polarizer disposed to receive light from the display and yield linearly polarized light that may be rotated by a liquid crystal layer depending on the voltage applied to the liquid crystal layer such that the liquid crystal layer and an analyzer that receives light from the liquid crystal layer can operate as a shutter for the light from the display that may be selectively open and closed to allow light from the display to pass or be blocked.

In some implementations, a head mounted display can include any of the eyepieces described herein.

In some implementations, the head mounted display can further include at least one eye tracking camera configured to track a gaze of a wearer's eye.

In some implementations, the head mounted display can further include at least one head pose sensor configured to assist in determining head movement, head orientation, head position or any combination of thereof.

In some implementations, the eye tracking sensor or the head pose sensor or both can be configured to such that when a wearer's gaze is directed to the first region of the eyepiece, a display may couple into the eye piece near image content and not distant image content, and when the wearer's gaze is directed toward the second region of the eyepiece, the display may couple light into the eyepiece distant image content and not near image content.

In some implementations, the head mounted display can include an augmented reality head mounted display.

In some implementations, the head mounted display can include a virtual reality head mounted display.

In another aspect, an eyepiece for a head-mounted display includes a first waveguide, at least one first in-coupling optical element, at least one first out-coupling optical element, a second waveguide, at least one second in-coupling optical element, at least one second out-coupling optical element, and at least one optical element.

The first waveguide has a front face, a rear face and a plurality of edges. The front face and the rear face of the first waveguide have lateral dimensions. The edges of the first waveguide have a thickness less than the lateral dimensions of the front face and the rear face of the first waveguide such that the first waveguide can guide light therein from a location closer to one edge toward a location closer to another edge by total internal reflection from the front and rear faces of the first waveguide.

The at least one first in-coupling optical element is configured to in-couple light into the first waveguide. The at least one first in-coupling optical element includes a wavelength selective optical element configured to couple more light of a first visible wavelength into the first waveguide to be guided therein than a second visible wavelength.

The at least one first out-coupling optical element is configured to receive light guided within the first waveguide by total internal reflection from the front face of the first waveguide and the rear face of the first waveguide and to out-couple light out of the front face of the first waveguide.

The second waveguide has a front face, a rear face and a plurality of edges. The front face and the rear face of the second waveguide have lateral dimensions. The edges of the second waveguide have a thickness less than the lateral dimensions of the front face and the rear face of the second waveguide such that the second waveguide can guide light therein from a location closer to one edge toward a location closer to another edge by total internal reflection from the front and rear faces of the second waveguide.

The at least one second in-coupling optical element is configured to in-couple light into the second waveguide. The at least one second in-coupling optical element includes a wavelength selective optical element configured to couple more light of the second visible wavelength into the second waveguide to be guided therein than the first visible wavelength;

The at least one second out-coupling optical element is configured to receive light guided with the second waveguide by total internal reflection from the front face of the second waveguide and the rear face of the second waveguide and to out-couple light out of the front face of the second waveguide.

The at least one optical element has optical power such that the eyepiece outputs a first portion of the light guided within the first waveguide and a first portion of the light guided within the second waveguide from a first region of the eyepiece as if the light originated from a first depth with respect to the first waveguide and the second waveguide, and outputs a second portion of the light guided within the first waveguide and a second portion of the light guided within the second waveguide from a second region of the eyepiece as if the light originated from a second depth with respect to the first waveguide and the second waveguide, the second region being laterally displaced with respect to the first region.

Implementations of this aspect can include one or more of the following features.

In some implementations, the light of a first visible wavelength can include one of red, green, and blue light. The light of a second visible wavelength cam include a different one of red, green, and blue light.

In some implementations, the at least one first out-coupling optical element can include a first region configured to out-couple light guided within the first waveguide as if the light originated from a first depth with respect to the first waveguide and a second region configured to out-couple light guided within the first waveguide as if the light originated from a second depth with respect to the first waveguide. The at least one second out-coupling optical element can include a first region configured to out-couple light guided within the second waveguide as if the light originated from a first depth with respect to the waveguide and a second region configured to out-couple light guided within the second waveguide as if the light originated from a second depth with respect to the second waveguide. The first region of the at least one first out-coupling optical element and the first region of the at least one second out-coupling optical element can correspond to the first region of the eyepiece, and the second region of the at least one first out-coupling optical element and the second region of the at least one second out-coupling optical element can correspond to the second region of the eyepiece.

In another aspect, a head-mounted display includes a display and an eyepiece. The display is configured to output light. The eyepiece includes at least one waveguide, at least one in-coupling optical element, at least one out-coupling optical element, and at least one optical element. The at least one waveguide is configured to guide light therein by total internal reflection. The at least one in-coupling optical element is configured to receive light output by the display and in-couple the light into the waveguide. The at least one out-coupling optical element is configured to receive light guided within the waveguide and to out-couple light out of the waveguide. The at least one optical element has optical power such that the eyepiece outputs a first portion of the light guided within the at least one waveguide as if the light originated from a first depth with respect to the at least one waveguide, and a second portion of the light guided within the at least one waveguide as if the light originated from a second depth with respect to the at least one waveguide. The second region is laterally displaced with respect to the first region.

Implementations of this aspect can include one or more of the following features.

In some implementations, the display can include a fiber scanning display.

In some implementations, the at least one out-coupling optical element can include a first region configured to out-couple light guided within the at least one waveguide as if the light originated from a first depth with respect to the at least one waveguide and a second region configured to out-couple light guided within the at least one waveguide as if the light originated from a second depth with respect to the at least one waveguide. The first region of the at least one out-coupling optical element can correspond to the first region of the eyepiece and the second region of the at least one out-coupling optical element can correspond to the second region of the eyepiece.

In another aspect, a head-mounted display includes an eyepiece partitioned into a first section configured to project a first image to an eye of a wearer and a second section configured to project a second image to the eye of the wearer. The first section has a first optical power, and the second section has a second optical power different from the first optical power, such that the second section image is projected as if from a different depth plane than the first image.

Implementations of this aspect can include one or more of the following features.

In some implementations, the first region and the section region can be laterally spaced within the field of view of the eye of the wearer.

In some implementations, the optical power of at least one of the first section and the second section can be reconfigurable.

In some implementations, the head-mounted display can include a virtual reality display.

In some implementations, the head-mounted display can include an augmented reality display.

In another aspect, an eyepiece for a head mounted display includes a waveguide, at least one out-coupling optical element, and at least one optical element. The waveguide has a front face, a rear face and a plurality of edges. The front face and the rear face have lateral dimensions. The edges have a thickness less than the lateral dimensions of the front face and the rear face such that the waveguide can guide light therein from a location closer to one edge toward a location closer to another edge by total internal reflection from the front and rear faces.

The at least one out-coupling optical element is configured to receive light guided within the waveguide by total internal reflection from the front face and the rear face and to out-couple light out of the front face of the waveguide.

The at least one optical element has optical power such that the eyepiece outputs a first portion of the light guided within the waveguide from a first region of the eyepiece as if the light originated from a first depth with respect to the waveguide and a second portion of light guided within the waveguide from a second region of the eyepiece as if the light originated from a second depth with respect to the waveguide. The second region is laterally displaced with respect to the first region.

Implementations of this aspect can include one or more of the following features.

In some implementations, the at least one optical element having optical power can be included in or disposed on the at least one out-coupling element.

In some implementations, the at least one out-coupling optical element can include a first region configured to out-couple light guided within the waveguide as if the light originated from a first depth with respect to the waveguide and a second region configured to out-couple light guided within the waveguide as if the light originated from a second depth with respect to the waveguide. The first region of the at least one out-coupling optical element can correspond to the first region of the eyepiece and the second region of the at least one out-coupling optical element can correspond to the second region of the eyepiece.

In some implementations, the at least one of the at least one out-coupling optical element or the at least one element having optical power can include a diffractive or holographic optical element.

In some implementations, the diffractive or holographic optical element can include an analog surface relief grating (ASR), a binary surface relief structure (BSR), or a switchable diffractive optical element.

In some implementations, the at least one optical element having optical power can include a refracting surface that has optical power.

In some implementations, the eyepiece can include an in-coupling optical element configured to in-couple light into the waveguide.

In some implementations, the eyepiece can further include a light distributing element configured to receive light from the in-coupling optical element and redirect the light toward the at least one out-coupling optical element.

In some implementations, at least one of the first region and the second region of the eyepiece can have a fixed optical power.

In some implementations, the eyepiece can further include a multiplexing system configured to selectively distribute a first portion of image content through the first region of the eyepiece and a second portion of the image content through the second region of the eyepiece.

In some implementations, the eyepiece can be included in a head mounted display to be worn on the head of a wearer having a field of view that includes the eyepiece and objects forward the eyepiece. The first portion of the image content can include image content to be presented in the portion of the field of view of the wearer coinciding with the first region of the eyepiece while the second portion of the image content can include image content to be presented in the portion of the field of view of the wearer coinciding with the second region of the eyepiece.

In some implementations, the image content in the first portion of the image content is not visible to the wearer in the portion of the field of view of the wearer coinciding with the second region of the eyepiece while the image content in the second portion of the image content is not visible to the wearer in the portion of the field of view of the wearer coinciding with the first region of the eyepiece.

In some implementations, the first region of the eyepiece can be forward and central of a wearer's eye while the second region of the eyepiece can be below the first region. The image content presented through the first region of the eyepiece can correspond to far image content while the image content presented through the second region of the eyepiece can correspond to near image content.

In some implementations, the multiplexing system can include a polarization modulator and respective first and second polarization filters associated with respective first and second regions of the eyepiece.

In some implementations, the polarization modulator can include a liquid crystal modulator including a liquid crystal layer disposed between electrodes configured to apply a voltage across the liquid crystal layer so as to cause linearly polarized light to rotate polarization angle.

In some implementations, the multiplexing system can be configured to present a first portion of the image content corresponding to first far image content through the first region of the eyepiece while blocking the first portion of the image content from exiting the second region of the eyepiece.

In some implementations, the multiplexing system can be configured to present a second portion of the image content corresponding to second near image content through the second region of the eyepiece while blocking the second portion of the image content from exiting the first region of the eyepiece.

In some implementations, the multiplexer system can include first and second shutters and the eyepiece can be configured to present far image content through the first region of the eyepiece while blocking the second region of the eyepiece with the second shutter and present near image content through the second region of the eyepiece at a different time while blocking the first region of the eyepiece with the first shutter.

In some implementations, the shutters each can include liquid crystal layers disposed between electrodes arranged to apply a voltage across the liquid crystal layers.

In some implementations, the liquid crystal shutters can further includes a polarizer and an analyzer.

In some implementations, the polarizer can be configured to provide linearly polarized light that is received by the liquid crystal layer and the liquid crystal layer can be configured to rotate the polarization angle of the linear polarized light depending on the voltage applied to the liquid crystal layer via the electrodes such that said linear polarization of the light may be made to be parallel or perpendicular to the linear polarization state that is transmitted by the analyzer.

In some implementations, when distant image content is to be displayed, the two shutters may be set such that the distant image content is passed through the first region of the eyepiece while the distant image content from the second region of the eyepiece is blocked while when near image content is being displayed. The two shutters may be set such that the near image content is passed through the second region of the eyepiece while the near image content from the first region of the eyepiece is blocked.

In another aspect, a head mounted display includes a frame, an eyepiece, and a display. The frame is configured to mount on a wearer. The eyepiece includes a waveguide, at least one out-coupling optical element, and at least one optical element.

The waveguide includes a front face, a rear face and a plurality of edges, The front face and the rear have having lateral dimensions, The edges have a thickness less than the lateral dimensions of the front face and the rear face such that the waveguide can guide light therein from a location closer to one edge toward a location closer to another edge by total internal reflection from the front and rear faces.

The least one out-coupling optical element is configured to receive light guided within the waveguide by total internal reflection from the front face and the rear face and to out-couple light out of the front face of the waveguide.

The at least one optical element has optical power such that the eyepiece outputs a first portion of the light guided within the waveguide from a first region of the eyepiece as if the light originated from a first depth with respect to the waveguide and a second portion of light guided within the waveguide from a second region of the eyepiece as if the light originated from a second depth with respect to the waveguide. The second region is laterally displaced with respect to the first region.

The display is configured to selectively couple into the eyepiece light including near image content and light comprising distant image content.

Implementations of this aspect can include one or more of the following features.

In some implementations, the head mounted can further include at least one eye tracking camera configured to track a gaze of the wearer's eye.

In some implementations, the eye tracking camera can be configured such that when the wearer's gaze is directed to the first region of the eyepiece, the display may couple into the eye piece light include near image content and not distant image content, and when the wearer's gaze is directed toward the second region of the eyepiece, the display may couple into the eyepiece light including distant image content and not near image content.

In some implementations, the head mounted display can further include at least one head pose sensor configured to assist in determining at least one of head movement, head orientation, and head position.

In some implementations, the head pose sensor can be configured such that the display selectively couples into the eyepiece light including near image content and not distant image content, or light including distant image content and not near image content, based on at least one of the head movement, head orientation, and head position of the wearer.

In some implementations, the head mounted display can include an augmented reality head mounted display.

In some implementations, the head mounted display can include a virtual reality head mounted display.

DETAILED DESCRIPTION

Figure 1:
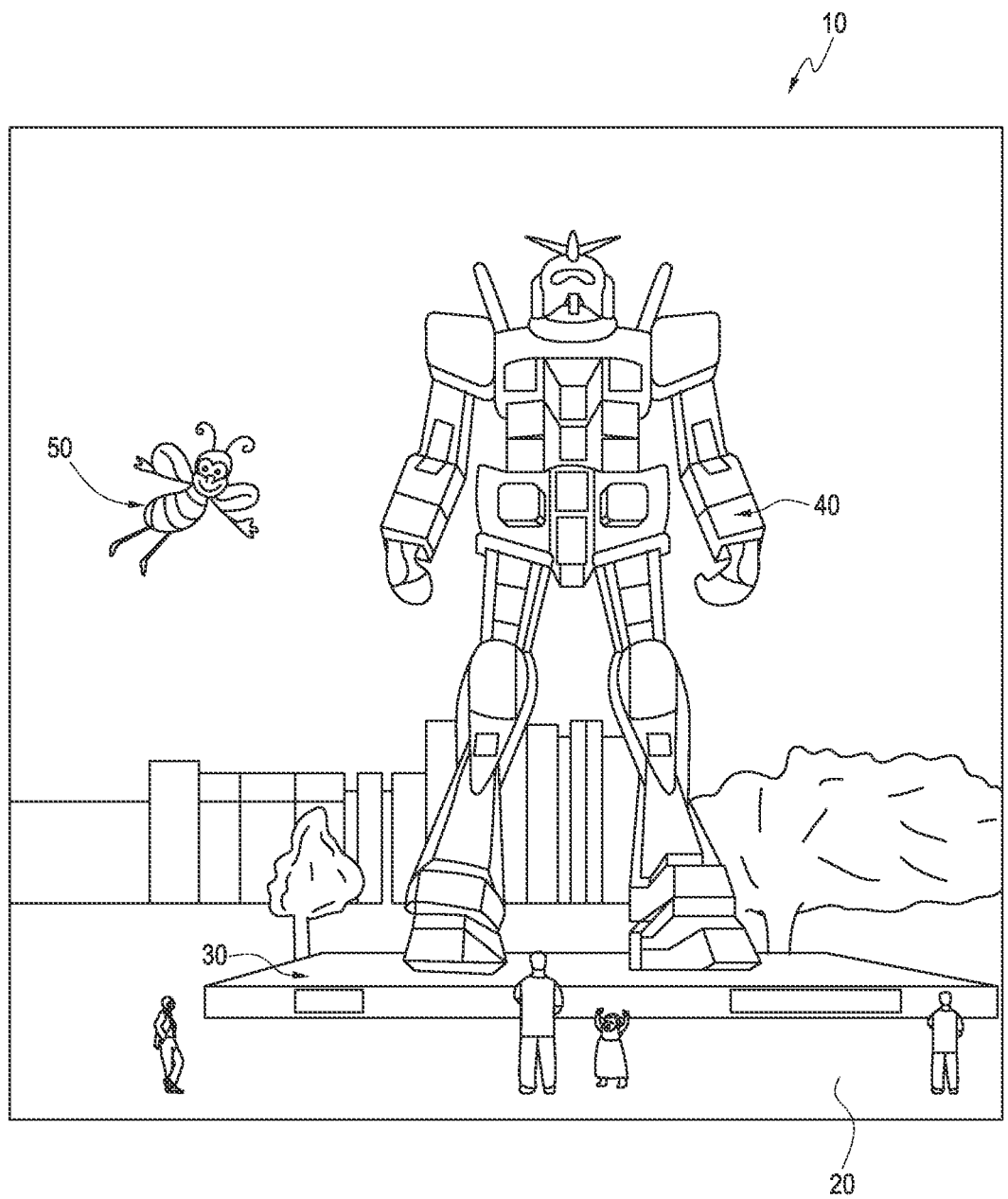
FIG. 1 illustrates a user's view of augmented reality (AR) through an AR device.

Reference will now be made to the figures, in which like reference numerals refer to like parts throughout. It will be appreciated that embodiments disclosed herein include optical systems, including display systems, generally. In some embodiments, the display systems are wearable, which may advantageously provide a more immersive VR or AR experience. For example, displays containing one or more waveguides (e.g., a stack of waveguides) may be configured to be worn positioned in front of the eyes of a user, or viewer. In some embodiments, two stacks of waveguides, one for each eye of a viewer, may be utilized to provide different images to each eye.

Example Display Systems

Figure 2:
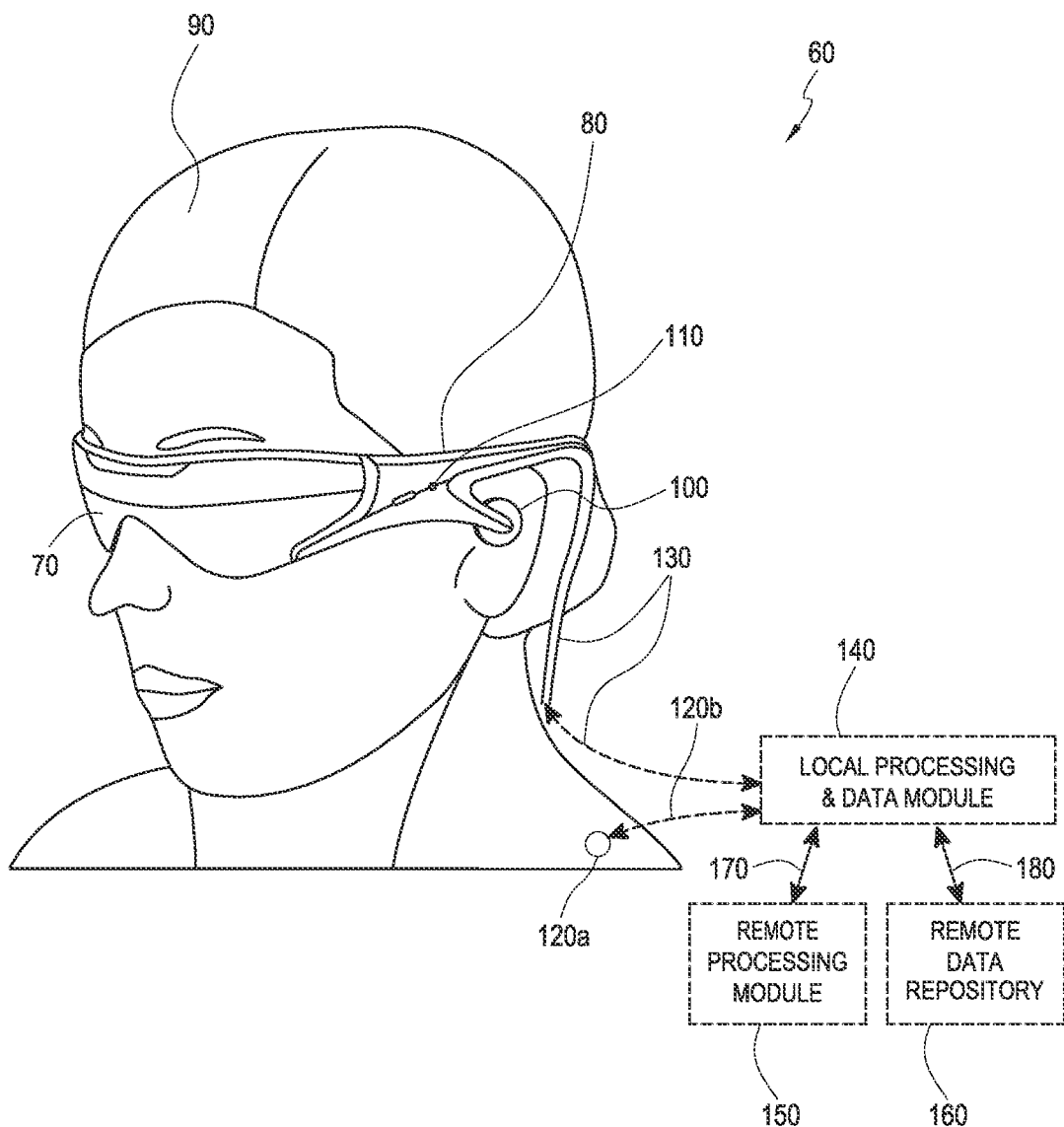
FIG. 2 illustrates an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing the physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
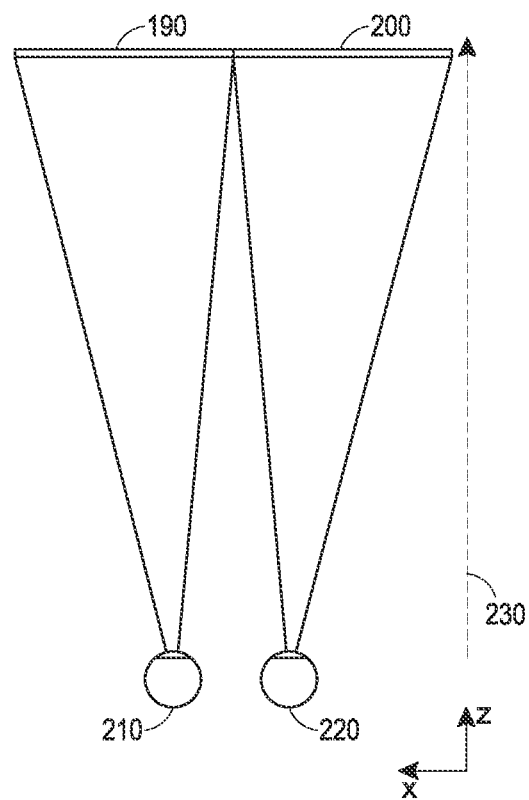
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
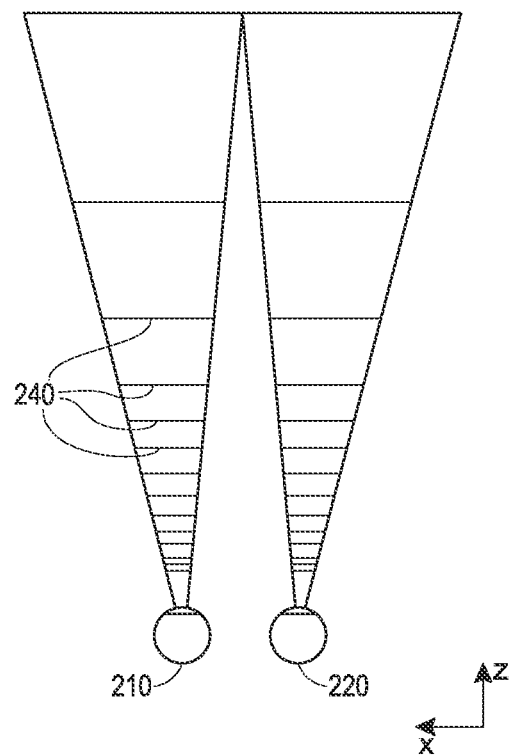
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
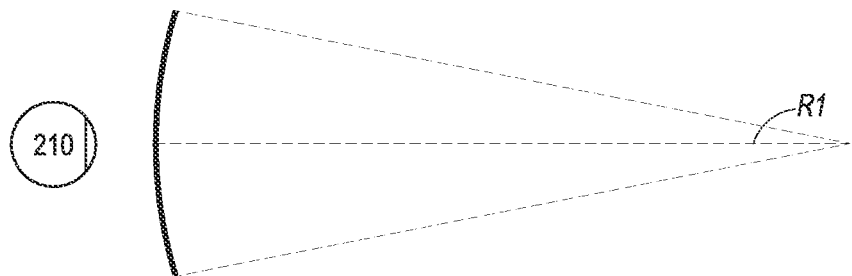
FIGS. 5A-5C illustrate relationships between radius of curvature and focal radius.
Figure 5B:
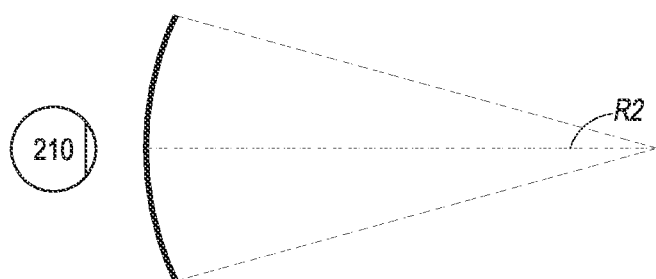
Figure 5C:
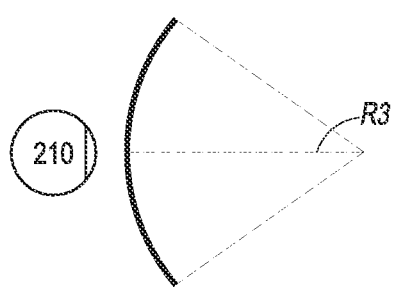

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
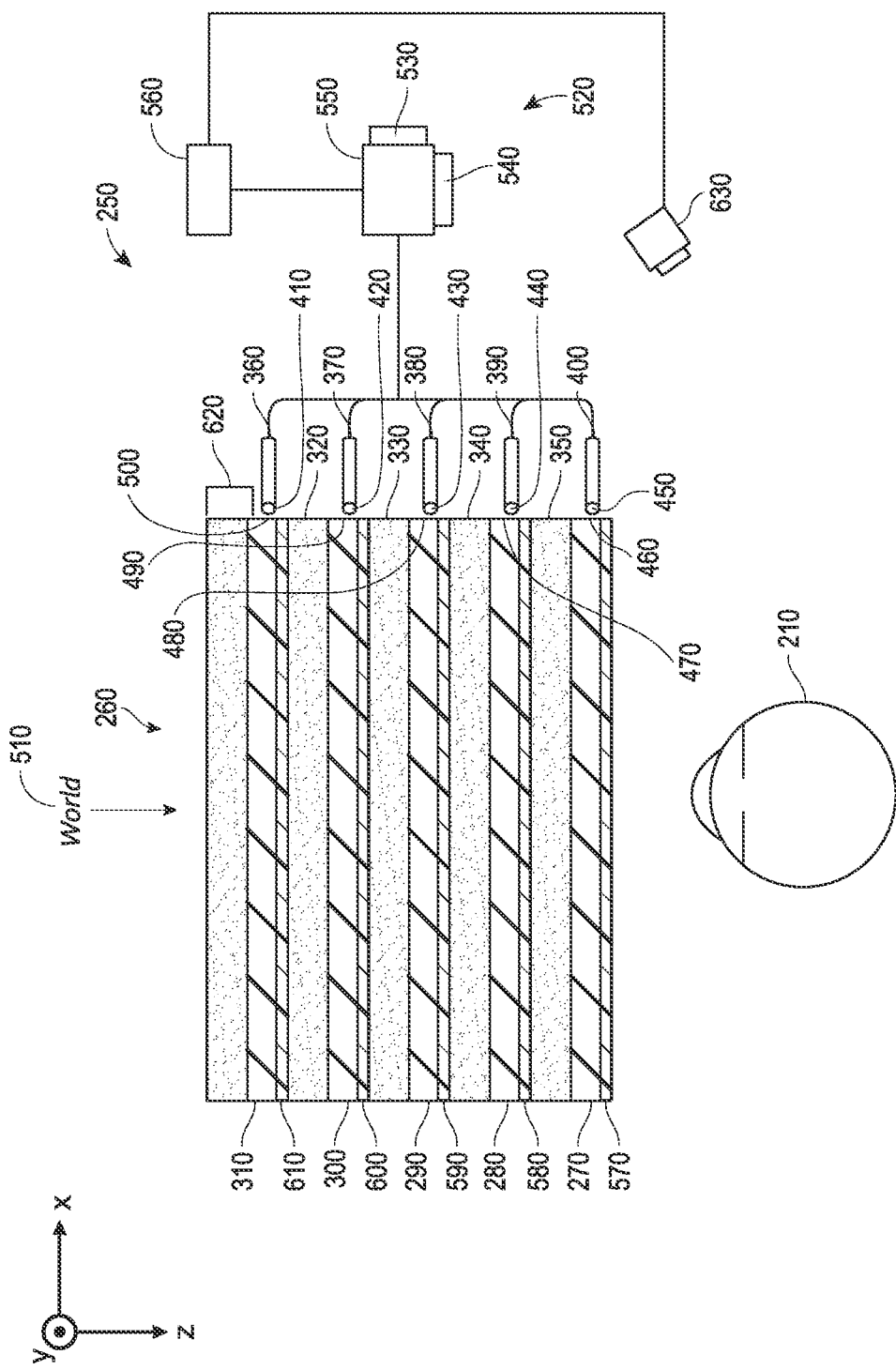
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280,

290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 630 may be utilized for each eye, to separately monitor each eye.

Figure 7:
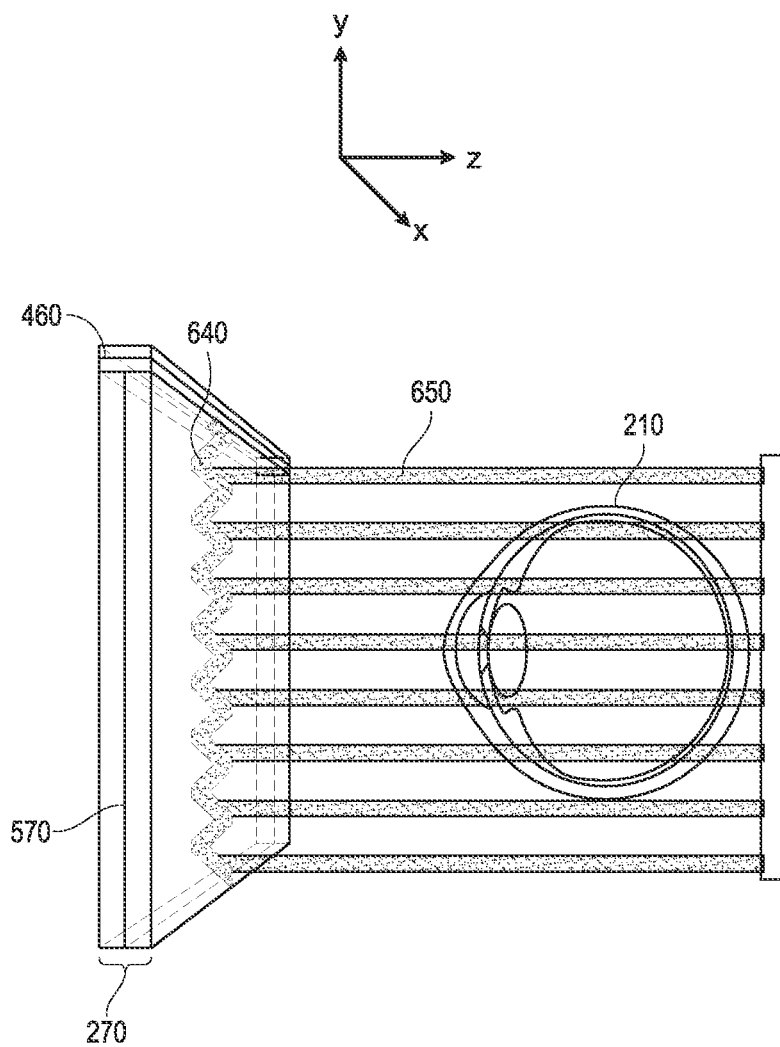
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide without-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
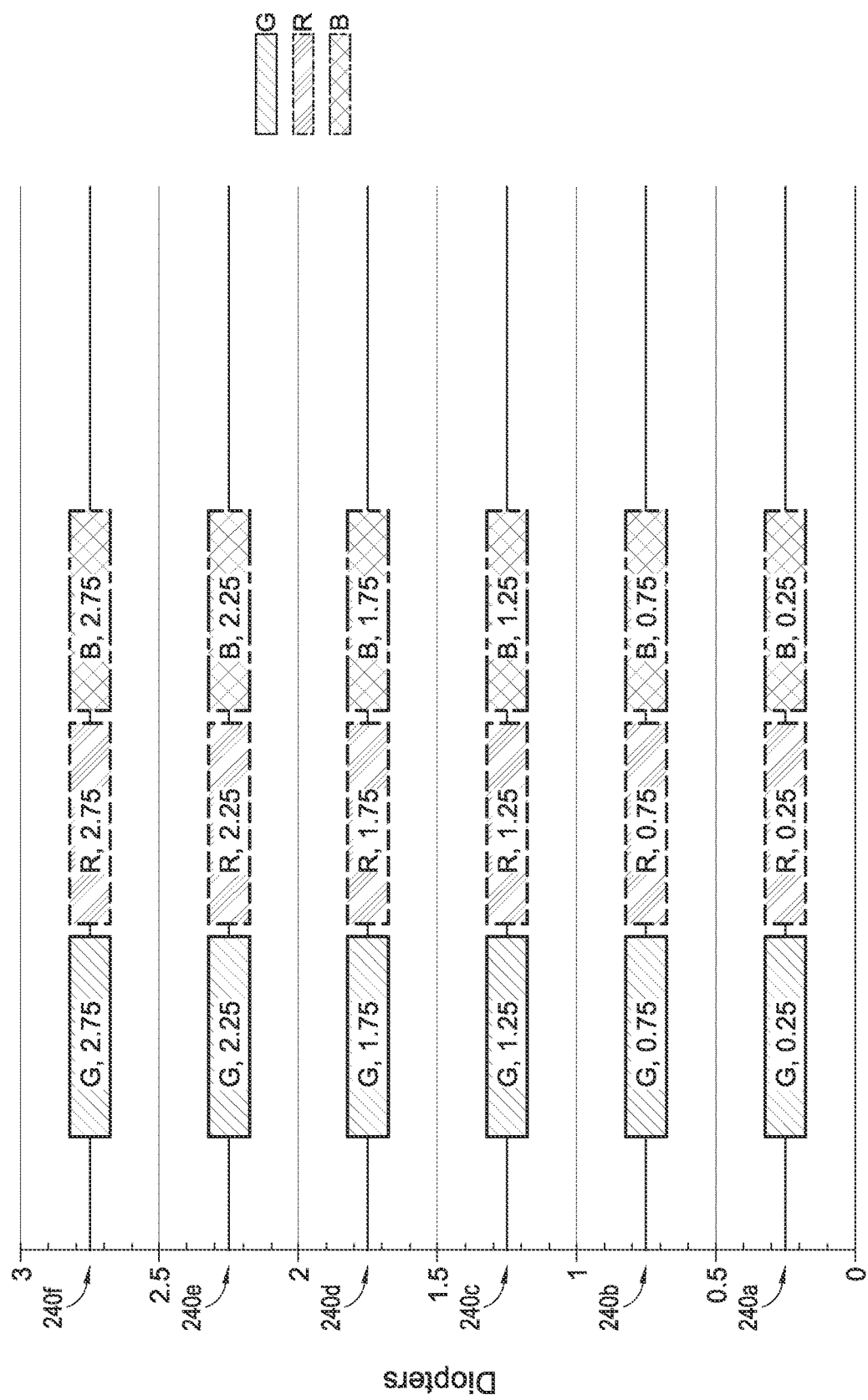
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
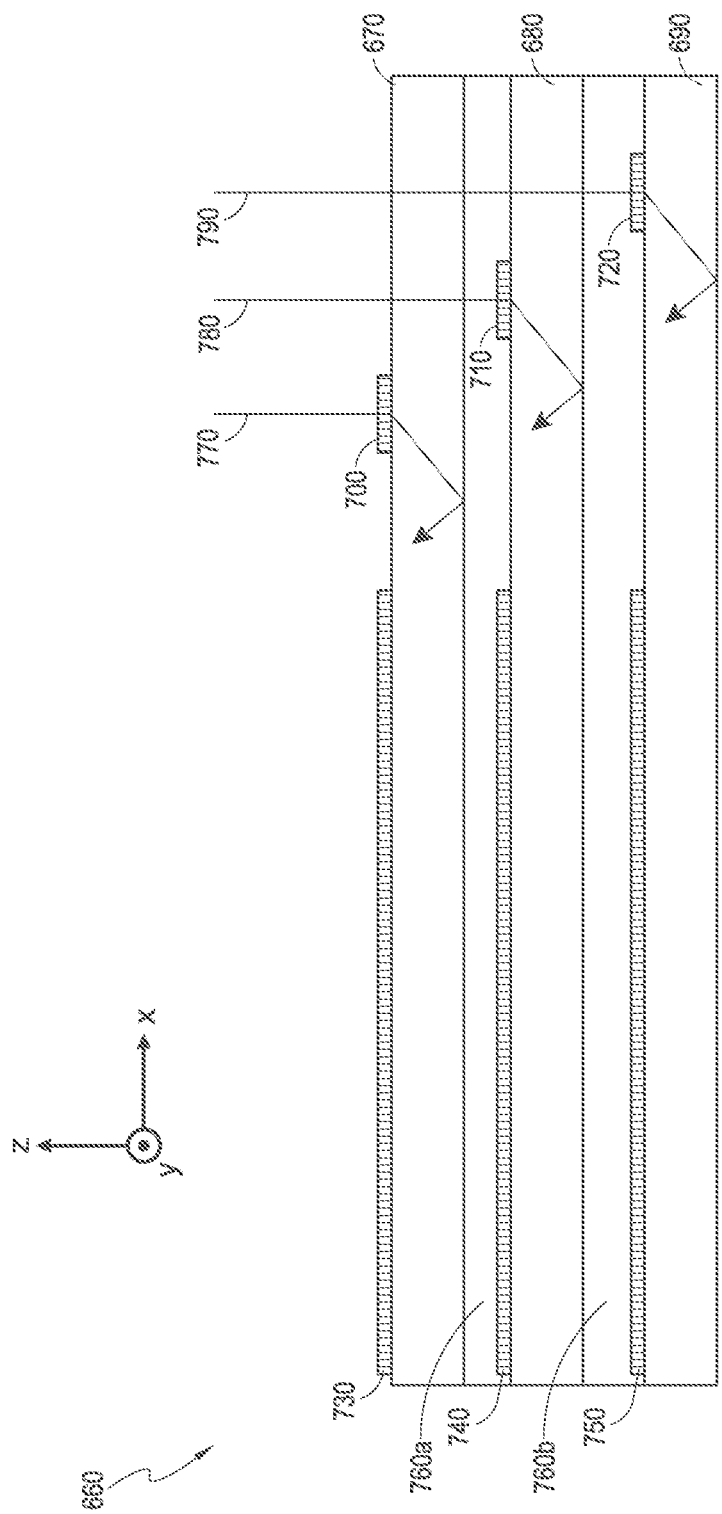
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. Light rays 770, 780, 790 may also be laterally displaced to different locations corresponding to the lateral locations of in-coupling optical elements 700, 710, 720. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR, and thus be guided therein. For example, deflection of light rays 770, 780, 790 may be caused by one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The light rays 770, 780, 790 propagate through the respective waveguide 670, 680, 690 by TIR, being guided therein until impinging on the waveguide's corresponding light distributing elements 730, 740, 750.

Figure 9B:
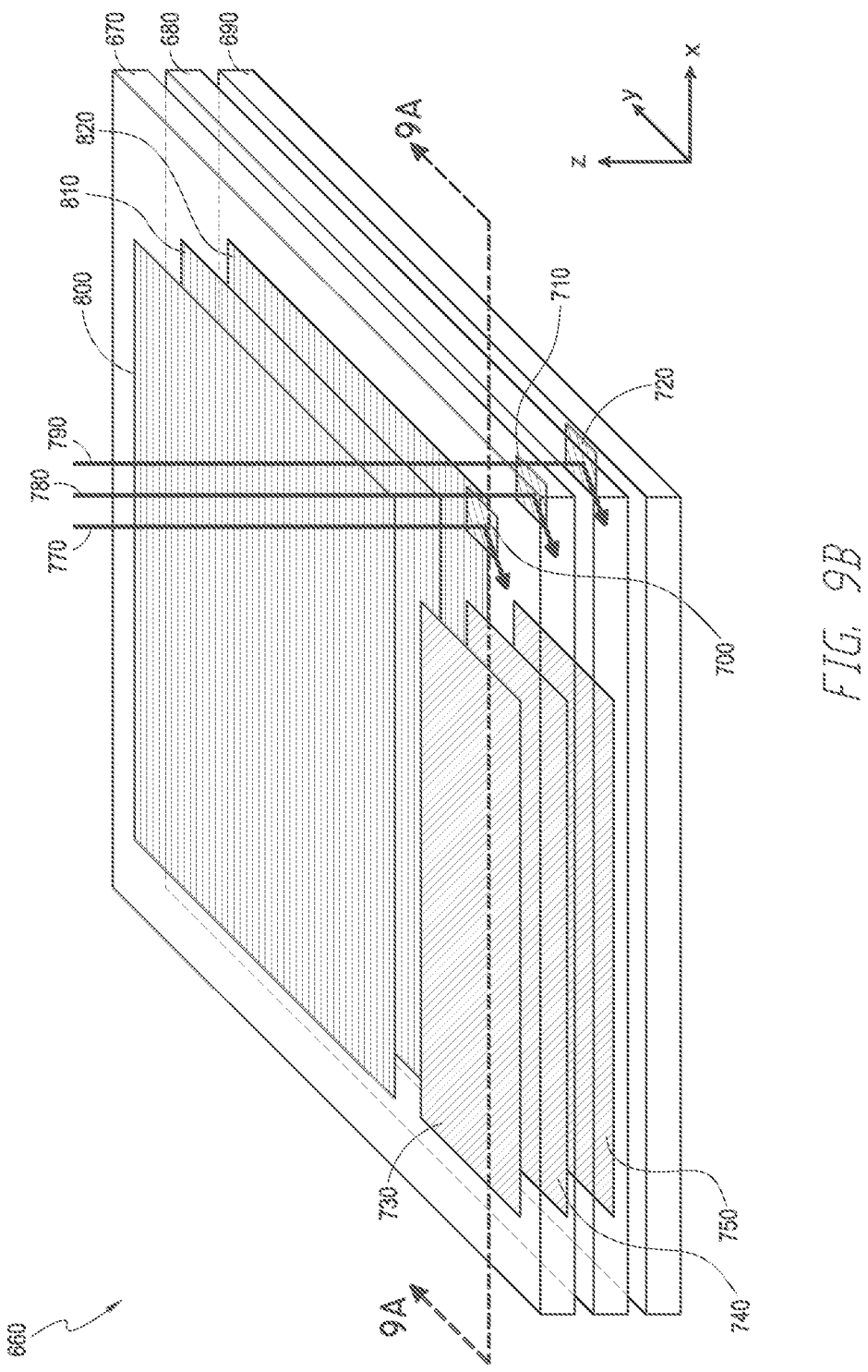
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR and are guided within the waveguides 670, 680, 690, respectively. The guided light rays 770, 780, 790 then impinge on the light distributing elements 730, 740, 750, respectively. The light distributing elements 730, 740, 750 may comprise one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The light rays 770, 780, 790 propagate through the respective waveguide 670, 680, 690 by TIR being guided therein until impinging on the waveguide's corresponding light distributing elements 730, 740, 750, where they are deflected, however, in a manner so that the light rays 770, 780, 790 are still guided within the waveguide. The light distributing elements 730, 740, 750 deflect the light rays 770, 780, 790 so that they propagate towards the out-coupling optical elements 800, 810, 820, respectively.

The out-coupling optical elements 800, 810, 820 are configured to direct light guided within the waveguide, e.g., the light rays 770, 780, 790, out of the waveguide and toward the viewer's eye. The out-coupling optical elements 800, 810, 820 may be configured therefore to deflect and redirect the light guided within the waveguide, e.g., light rays 770, 780, 790, at a more normal angle with respect to the surfaces of the waveguide so as to reduce the effects of total internal reflection (TIR) such that light is not guided within the waveguide but instead exits therefrom. Moreover, these out-coupling optical elements 800, 810, 820 may be configured to deflect and redirect this this light, e.g., light rays 770, 780, 790, toward the viewer's eye. Accordingly, the out-coupling optical elements 800, 810, 820 may comprise one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the light guide. The optical elements 800, 810, 820 may be configured to reflect, deflect, and/or diffract the light rays 770, 780, 790 so that they propagate out of the waveguide toward the user's eye.

In some embodiments, the light distributing elements 730, 740, 750 are orthogonal pupil expanders (OPE's) that guide light to the out-coupling optical elements 800, 810, 820. In some embodiments, the OPE's both deflect or distribute light to the out-coupling optical elements 800, 810, 820 and also replicate the beam or beams to form a larger number of beams which propagate to the out-coupling optical elements. As a beam travels along the OPE's, a portion of the beam may be split from the beam and travel in a direction orthogonal to the beam, in the direction of out-coupling optical elements 800, 810, 820. Orthogonal splitting of the beam in the OPE's may occur repeatedly along the path of the beam through the OPE's. For example, OPE's may include a grating having an increasing reflectance along the beam path such that a series of substantially uniform beamlets are produced from a single beam. In some embodiments, the out-coupling optical elements 800, 810, 820 are exit pupils (EP's) or exit pupil expanders (EPE's) that direct light in a viewer's eye 210 (FIG. 7). The OPE's may be configured to increase the dimensions of the eye box, for example, along the x direction, and the EPE's may be to increase the eye box in an axis crossing, for example, orthogonal to, the axis of the OPE's, e.g., along the y direction.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EPE's) 800, 810, 820 for each component color. The waveguides 670, 680, 690 may be stacked with an air gap and/or cladding layer between each one. The in-coupling optical elements 700, 710, 720 redirect or deflect incident light (with different in-coupling optical elements receiving light of different wavelengths) into its respective waveguide. The light then propagates at an angle which will result in TIR within the respective waveguide 670, 680, 690, and the light is guided therein. In the example shown, light ray 770 (e.g., blue light) is deflected by the first in-coupling optical element 700, and then continues to propagate within the waveguide being guided therein, interacting with the light distributing element (e.g., OPE's) 730 where it is replicated into a plurality of rays propagating to the out-coupling optical element (e.g., EPE's) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPE's) 740 where it is replicated into a plurality of rays propagating to the out-coupling optical element (e.g., EPE's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPE's) 750 by TIR, where it is replicated into a plurality of rays propagating to the out-coupling optical element (e.g., EPE's) 820 by TIR. The out-coupling optical element 820 then finally further replicates and out-couples the light rays 790 to the viewer, who also receives the out-coupled light from the other waveguides 670, 680.

In some embodiments, the set of stacked waveguides are suitable for use as an eyepiece of a wearable display system (e.g., a head-mounted display device, such as that shown and described with respect to FIG. 2). Further, the eyepiece can define a usable aperture or eyebox of the head-mounted display device for an eye of a user of the head-mounted display device, through which the user can view the user's environment and virtual images generated by the head-mounted display device overlaid with the user's environment during operation of the head-mounted display device.

Figure 9C:
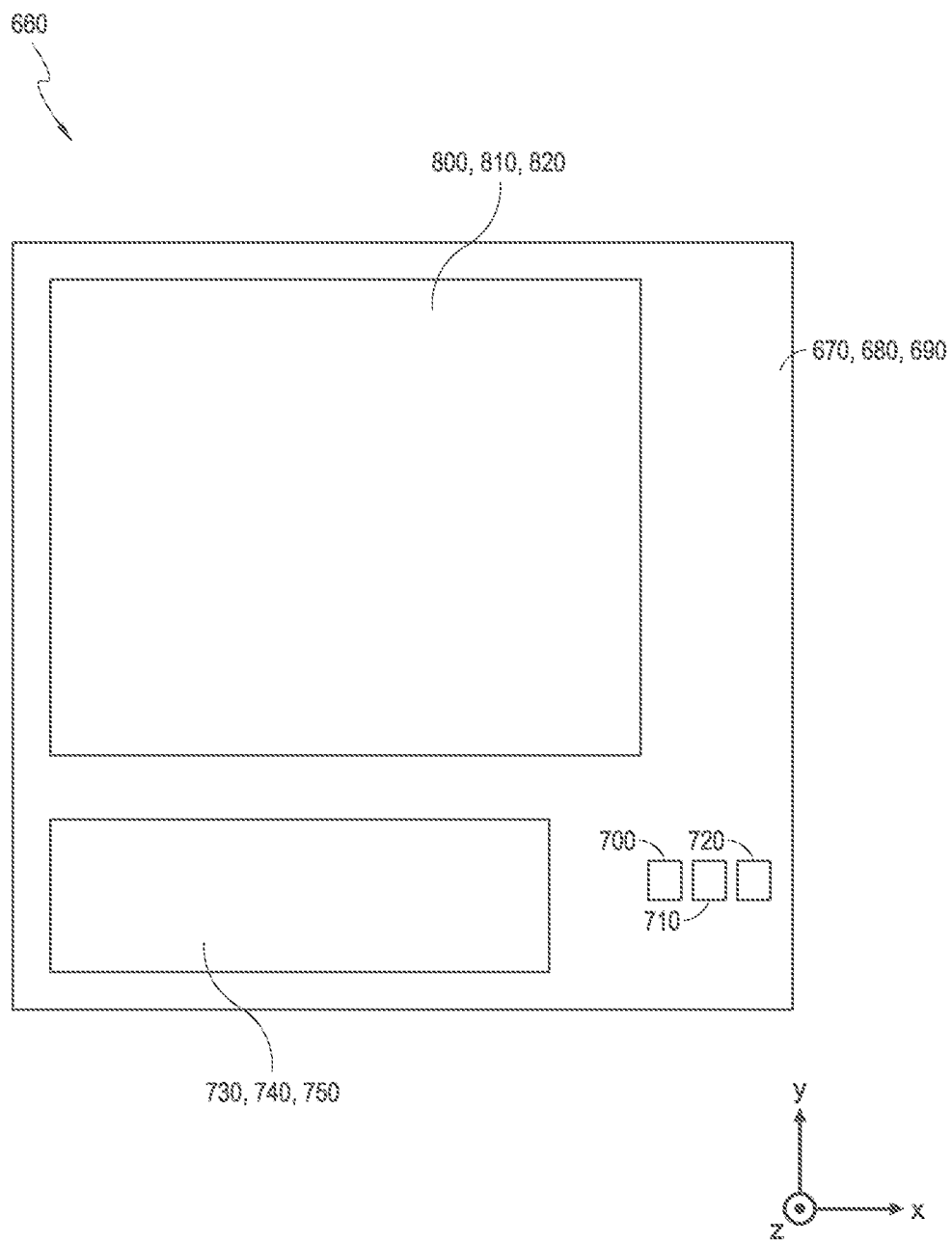
FIG. 9C illustrates a top-down plan view of an example of the plurality of stacked waveguides of FIGS. 9A and 9B.

FIG. 9C illustrates a top-down plan view (or front view) of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned (e.g., along the x and y directions). However, as discussed herein, the in-coupling optical elements 700, 710, 720 are not vertically aligned; rather, the in-coupling optical elements are preferably non-overlapping (e.g., laterally spaced apart along the x direction as seen in the top-down view of front view in this example). Shifting in other directions, such as the y direction, can also be employed. This non-overlapping spatial arrangement facilitates the injection of light from different resources such as different light sources and/or displays into different waveguides on a one-to-one basis, thereby allowing a specific light source to be uniquely coupled to a specific waveguide. In some embodiments, arrangements including non-overlapping laterally-separated in-coupling optical elements may be referred to as a shifted pupil system, and the in-coupling optical elements within these arrangements may correspond to sub-pupils.

In addition to coupling light out of the waveguides, the out-coupling optical elements 800, 810, 820 may cause the light to be collimated or to diverge as if the light originated from an object at a far distance or a closer distance, depth, or depth plane. Collimated light, for example, is consistent with light from an object that is far from the view. Increasing diverging light is consistent with light from an object that is closer, for example, 5-10 feet or 1-3 feet, in front of the viewer. The natural lens of the eye will accommodate when viewing an object closer to the eye and the brain may sense this accommodation, which also then serves as a depth cue. Likewise, by causing the light to be diverging by a certain amount, the eye will accommodate and perceive the object to be at closer distance. Accordingly, the out-coupling optical elements 800, 810, 820 can be configured to cause the light to be collimated or to diverge as if the light emanated from a far or close distance, depth, or depth plane. To do so, the out-coupling optical elements 800, 810, 820 may include optical power. For example, the out-coupling optical elements 800, 810, 820, may include holographic, diffractive, and/or reflective optical elements that in addition to deflecting or re-directing the light out of the waveguides, these holographic, diffractive, and/or reflective optical elements may further include optical power to cause the light to be collimated or diverging. The out-coupling optical elements 800, 810, 820 may in the alternative or in addition include refracting surfaces that include optical power that cause the light to be collimated or diverging. The out-coupling optical elements 800, 810, 820 may therefore comprise, for example, in addition to diffractive or holographic turning features, a refractive surface the provides optical power. Such refractive surface may also be included in addition to the out-coupling optical elements 800, 810, 820, for example, on top of the out-coupling optical elements 800, 810, 820. In certain embodiments, for example, optical elements, for example, diffractive optical element, holographic optical elements, refractive lens surfaces, or other structures may be disposed with respect to the out-coupling optical elements 800, 810, 820 to provide the optical power cause the collimation or divergence of the light. A layer with optical power such as a layer with a refractive surface or a layer with diffractive and/or holographic features may for example be disposed with respect to the out-coupling optical elements 800, 810, 820 to additionally provide optical power. A combination of contributions from both the out-coupling optical elements 800, 810, 820 having optical power and an additional layer with optical power such as a layer with a refractive surface or a layer with diffractive and/or holographic features is also possible.

Figure 10A:
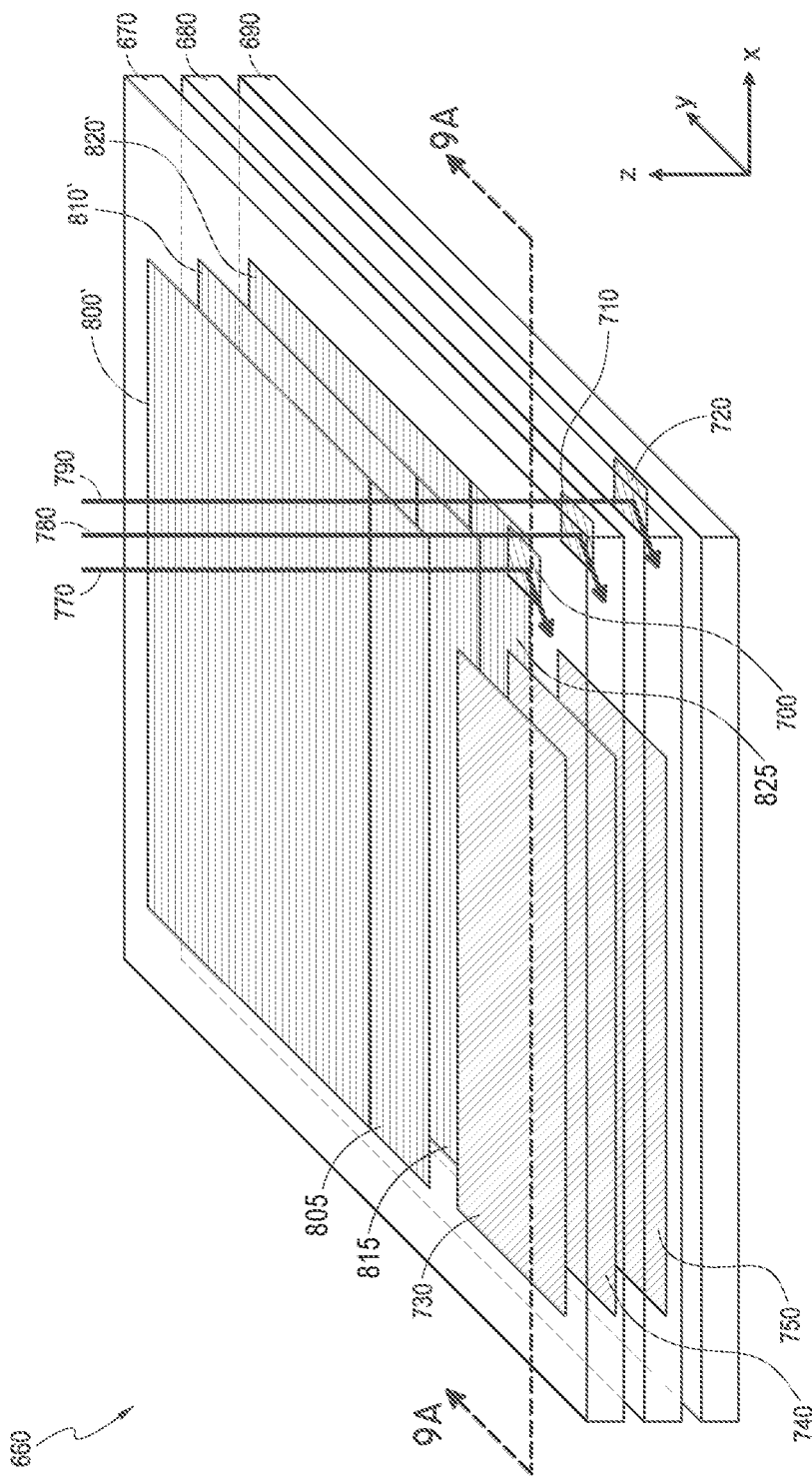
FIG. 10A schematically illustrates a perspective view of an example of a plurality of stacked waveguides including a dual depth exit pupil expander.
Figure 10B:
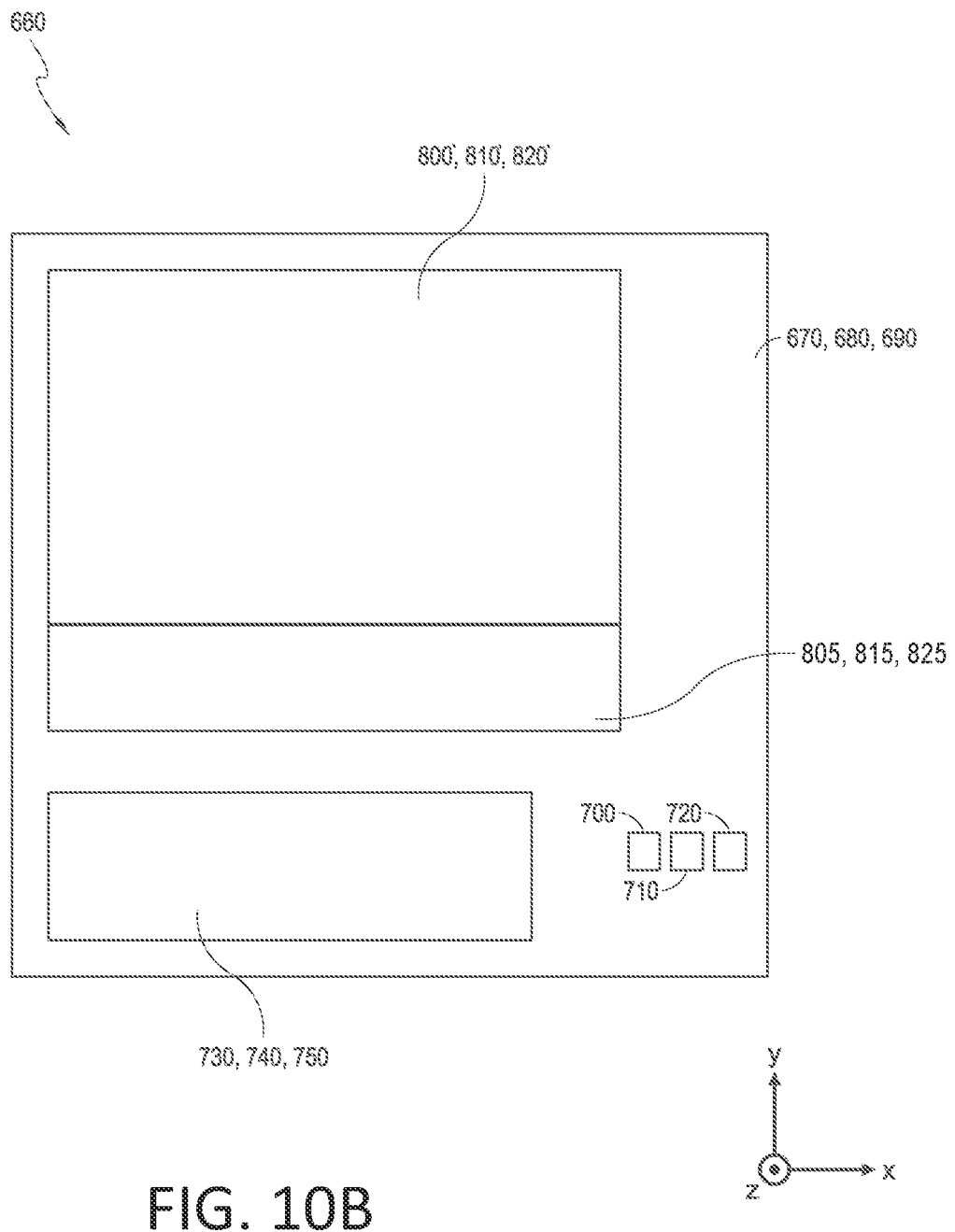
FIGS. 10B-10E schematically illustrate top-down plan views of example of a plurality of stacked waveguides including a dual depth exit pupil expander.
Figure 10C:
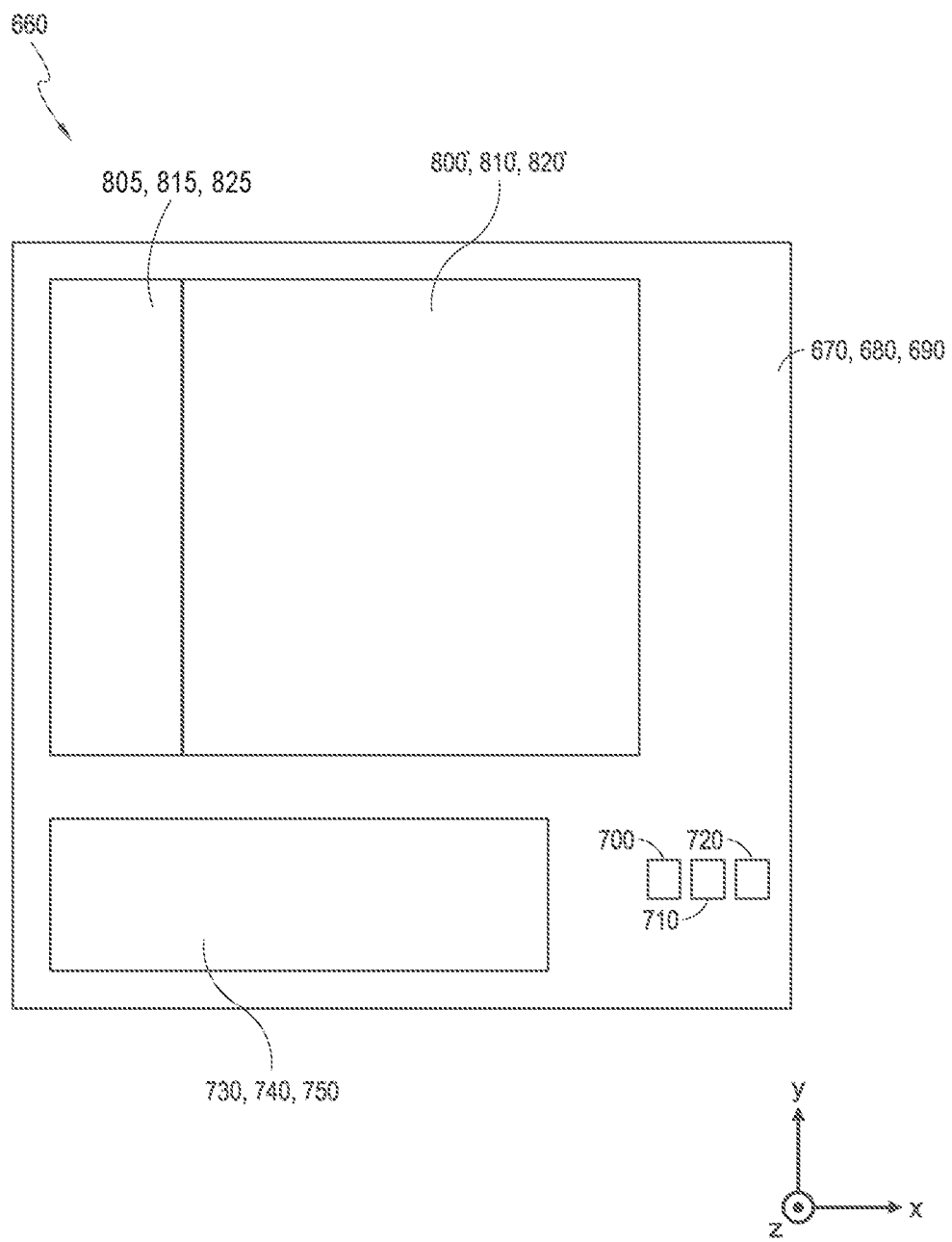
Figure 10D:
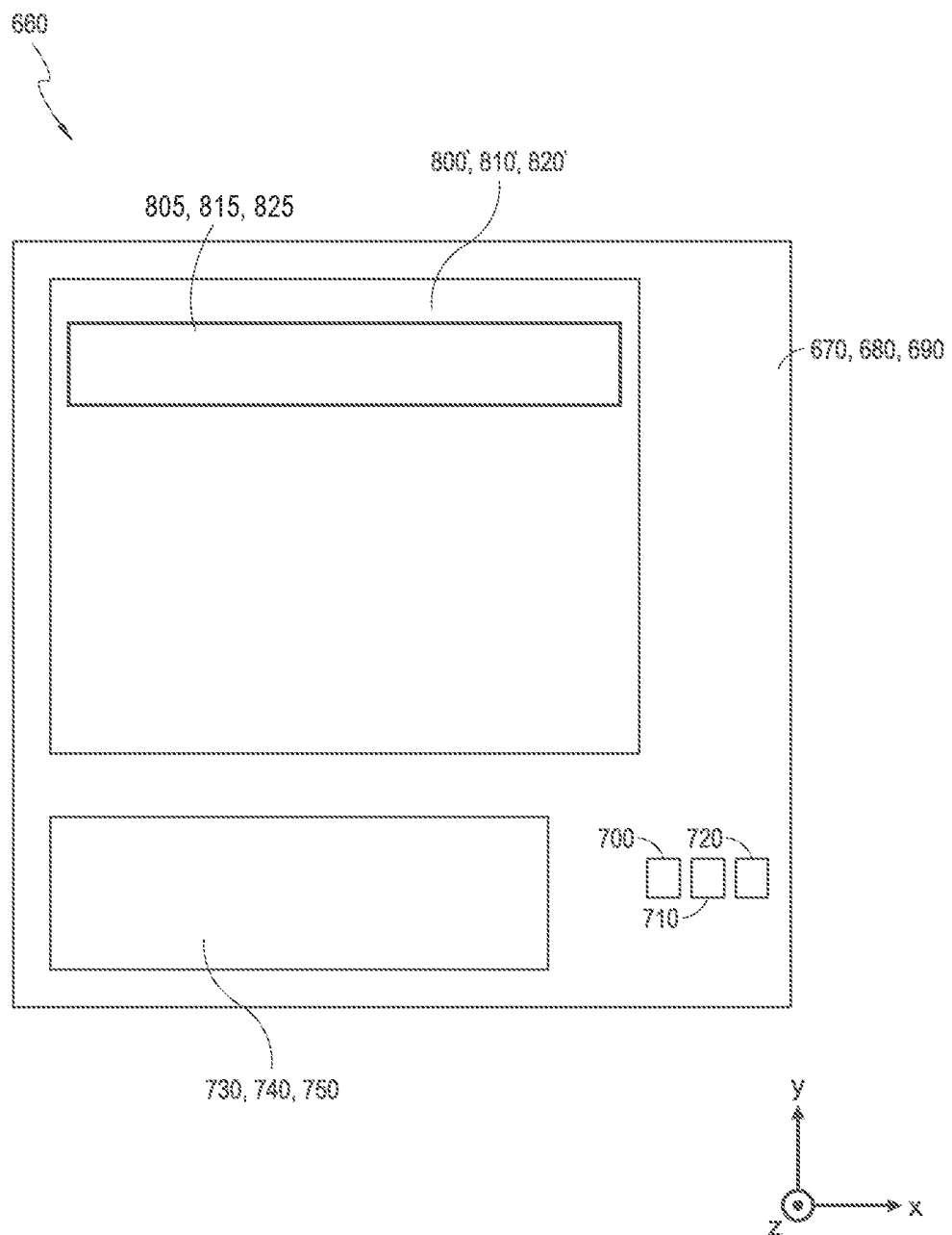

Referring now to FIGS. 10A-10E, the out-coupling optical elements 800, 810, 820 depicted in FIGS. 9B and 9C may include a plurality of sub-regions configured to project light as if the light is emanating from different depths or depth planes. For example, the stacked waveguide assembly 660 may include EPE's 800', 810', 820' having sub-regions 805, 815, 825, each configured to out-couple the in-coupled light rays 770, 780, 790 in a sub-region of an EPE 800', 810', 820', as well as to cause the light to be diverging or collimated as if the light emanated from a depth different from the depth of the remainder of the EPE 800', 810', 820'. As shown in the top-down plan views of FIGS. 10B-10E, the sub-regions 805, 815, 825 may be vertically aligned such that they occupy the same lateral region when viewed from the top down, e.g., the same region as projected on the x-y coordinate plane as depicted in FIG. 10A.

Out-coupling of light from the waveguides as if emanating from different depths may be accomplished by providing sub-regions 805, 815, 825 with an optical power different from the optical power (if any) of the remainder of the EPE 800', 810', 820' (e.g., a focal length different from the focal length of the remainder of the EPE 800', 810', 820'). For example, the sub-regions or zones 805, 815, 825 may have a higher or lower optical power so as to focus the virtual image at a different position within the eyebox, for example, as if the virtual images in the two regions are projected from different depths. For instance, the sub-regions 805, 815, 825 may include negative optical power that causes the light to diverge as if the light is emanating from a location a couple of feet in front of the viewer, while the remainder of the EPE 800', 810', 820' has no optical power or less negative optical power that causes the light to be collimated as if the light originated from a very distant object. The optical power of the sub-region 805, 815, 825 may be selected based on the desired depth of the sub-region 805, 815, 825 relative to the remainder of the EPE, e.g., region or zone 800', 810', 820'. In some embodiments, more than two regions of different optical power may be provided for out-coupling of light 770, 780, 790. As described above, the optical power of each region may be determined by the structure of the out-coupling elements or other elements of the system.

Regions may have various shapes or locations within an EPE. For example, sub-region 805, 815, 825 may be located along a top, side (e.g., left or right), or bottom edge of the EPE, and/or may be surrounded within the region 800', 810', 820'. Region 800', 810', 820' and sub-regions 805, 815, 825 may be square, rectangular, trapezoidal, elliptical, etc., as viewed in an x-y plane or other shapes. For example, the implementation depicted in FIG. 10C includes a sub-region similar to the sub-region of FIG. 10B, but configured to include the extent of the left side of the EPE disposed to the left of the partition line. The implementation depicted in FIG. 10D includes a sub-region located near the top of the EPE, and surrounded within the region 800', 810', 820'. The implementation depicted in FIG. 10E includes an elliptical sub-region located near the right side of the EPE and similarly surrounded within the region 800', 810', 820'. Any of the shapes, locations, or other qualities of the sub-regions described and depicted with reference to FIGS. 10B-10E may be combined in various implementations. For example, sub-regions 805, 815, 825 may be included on both the left and right of the EPE, or left and bottom, right and bottom, left and top, or right and top of the EPE. The different sub-regions 805, 815, 825 may have different sizes and/or shapes when multiple sub-regions 805, 815, 825 are included. It may be preferable in some embodiments to locate the sub-region 805, 815, 825 near the periphery of the EPE, e.g., along an edge or nearer to the periphery than to the center of the EPE, so as to avoid interfering with primary content displayed in region 800', 810', 820'. The size of the sub-region 805, 815, 825 may be any suitable size for displaying content, such as between 5%-10%, 10%-15%, 15%-20%, or 20%-25%, of the entire lateral extent of the EPE (e.g., the horizontal and vertical or x-y lateral extent of the EPE area) or more or less, or any combination of these ranges. Moreover, the transition between the optical power of region 800', 810', 820' and the optical power of region 805, 815, 825 may be abrupt or discrete at a border between the optical power regions, or may be a smooth, continuous, or gradual transition.

As described above, the out-coupling optical elements 800, 810, 820 may comprise one or more reflective, diffractive, and/or holographic optical elements, such as a holographic, diffractive, and/or reflective turning feature, reflector, or mirror configured to turn or redirect light, for example, so as to be guided with the light guide. Deflection may in some cases be caused by microstructure such as diffractive features in one or more gratings, and/or holographic and/or diffractive optical elements. The optical elements 800, 810, 820 may be configured to reflect, deflect, and/or diffract the light rays 770, 780, 790 so that they propagate out of the waveguide toward the users eye. In addition, the out-coupling optical elements 800, 810, 820, can include optical power to cause the light to be collimated or to diverge as if the light emanated from a far or close distance, depth, or depth plane. For example, the out-coupling optical elements 800, 810, 820, may include holographic, diffractive, and/or reflective optical elements that in addition to deflecting or re-directing the light out of the waveguides, these holographic, diffractive, and/or reflective optical elements may further include optical power to cause the light to be collimated or diverging. The out-coupling optical elements 800, 810, 820 may also comprises a refractive surface that refracts or bends the light to provide a lensing effect. As described above, different optical power can be provided to different sections of the out-coupling optical elements 800, 810, 820. Also as described above the transition between the optical power of region 800', 810', 820' and the optical power of region 805, 815, 825 may be abrupt or discrete at a border between the optical power regions, or may be a smooth, continuous, or gradual transition. In examples where a refractive surface provided optical power, the two regions or zones of different optical powers may be formed from and comprise a freeform surface.

Also as described above, in certain embodiments, optical elements, for example, diffractive optical element, holographic optical elements, refractive lens surfaces, or other structures may be disposed with respect to the out-coupling optical elements 800, 810, 820 to provide the optical power cause the collimation or divergence of the light. A layer with optical power such as a layer with a refractive surface or a layer with diffractive and/or holographic features may for example be disposed with respect to (e.g., on top of) the out-coupling optical elements 800, 810, 820 to additionally provide optical power. A combination of contributions from both the out-coupling optical elements 800, 810, 820 having optical power and an additional layer with optical power such as a layer with a refractive surface or a layer with diffractive and/or holographic features is also possible. As described above, different optical power can be provided to different sections of the out-coupling optical elements 800, 810, 820. Also as described above the transition between the optical power of region 800', 810', 820' and the optical power of region 805, 815, 825 may be abrupt or discrete at a border between the optical power regions, or may be a smooth, continuous, or gradual transition. Accordingly, in examples where a refractive surface provides optical power, the two regions or zones of different optical powers may be formed from and comprise a freeform surface.

A multiple-depth EPE including regions 805, 815, 825 configured to project light as if emanating from a depth or depth plane other than the depth or depth plane associated with of another portion of out-coupling elements 800', 810', 820' may provide several advantages. In some embodiments, the multiple-depth EPE may be provided within a head mounted display to facilitate the simultaneous viewing of a plurality of different content types (e.g., distant objects versus text) by a wearer. The multiple-depth EPE may provide a more realistic presentation of content at multiple depth planes, and may avoid increasing computer hardware and/or software processing and/or processing requirements, including additional electrical power usage, to generate content at different depths or depth planes. More specifically, projecting images appearing at different depths or depth planes in different regions of the display using multiple stacked sets of waveguides, one set for each depth or depth plane, where each waveguide provides a full frame, may potentially involve significant additional computation and/or processing, which may be a burden on processing resources and frame rate of the display. Thus, the multiple-depth EPE wherein multiple depths or depth planes are provided for a single waveguide and a single full frame, can provide content appearing at a plurality of depth planes with reduced impact on processing resources or frame rate in comparison to a system that provides multiple depths or depth planes using different waveguides presenting full frames.

In one example, sub-regions 805, 815, 825 of the EPE's 800', 810', 820' can have a lens function that projects light that appears to be coming from a focal plane closer inward to the eye than the light projected from the remainder of the EPE's 800', 810', 820'. The nearer focal plane of sub-regions 805, 815, 825 can be used to project detailed and/or readable content. For example, a user may watch virtual content, such as a movie or other visual content, while simultaneously checking e-mail or viewing other detailed content in sub-region 805, 815, 825. Further implementations can include presenting text, captions, a "ticker" display or icons in one sub-region at the bottom or side of the eyepiece containing readable content such as news, sports information, financial information, icons for providing user selection or the like. In one example, an augmented reality system may use various recognition software functions to identify people and/or things within a wearer's field of view such that these items may be tagged, flagged, or otherwise identified. Augmented content, such as an arrow, highlighted region, or other visual content displayed through the EPE's 800', 810', 820' may direct the user's attention to a person or item of interest, while detailed content, such as words, images, symbols, or other information associated with the person or item may be displayed at a closer depth plane in a sub-region 805, 815, 825. In another example, an augmented reality system may can display some virtual content (e.g., a movie or other visual content) to a user at a farther depth plane, while displaying visual elements of a graphical user interface (e.g., a menu bar with selectable commands or options) at a closer depth plane. This can be beneficial, for example, as it enables a user to better distinguish between different types of displayed content. In some implementations, a persistent graphical user interface (e.g., a dashboard or heads-up display) can be presented to the user at a closer depth plane.

For various types of near and distant content as described above, it may be desirable to selectively project only the near content through the sub-region 805, 815, 825, while projecting only the distant content through the remainder of the EPE's 800', 810', 820'. For example, in some situations the sub-region 805, 815, 825 may be on the lower portion of the EPE's 800', 810', 820' in a location where a viewer would gaze downward to view. This downward gaze is also commonly used to read or to view close-up objects. Accordingly, the sub-region 805, 815, 825, may be configured to present near image content while the remainder of the EPE's 800', 810', 820' may be configured to present far image content. Various approaches may be utilized to separate far and near image content into the two regions of each EPE 800', 810', 820', the upper and lower sub-regions.

Figure 11A:
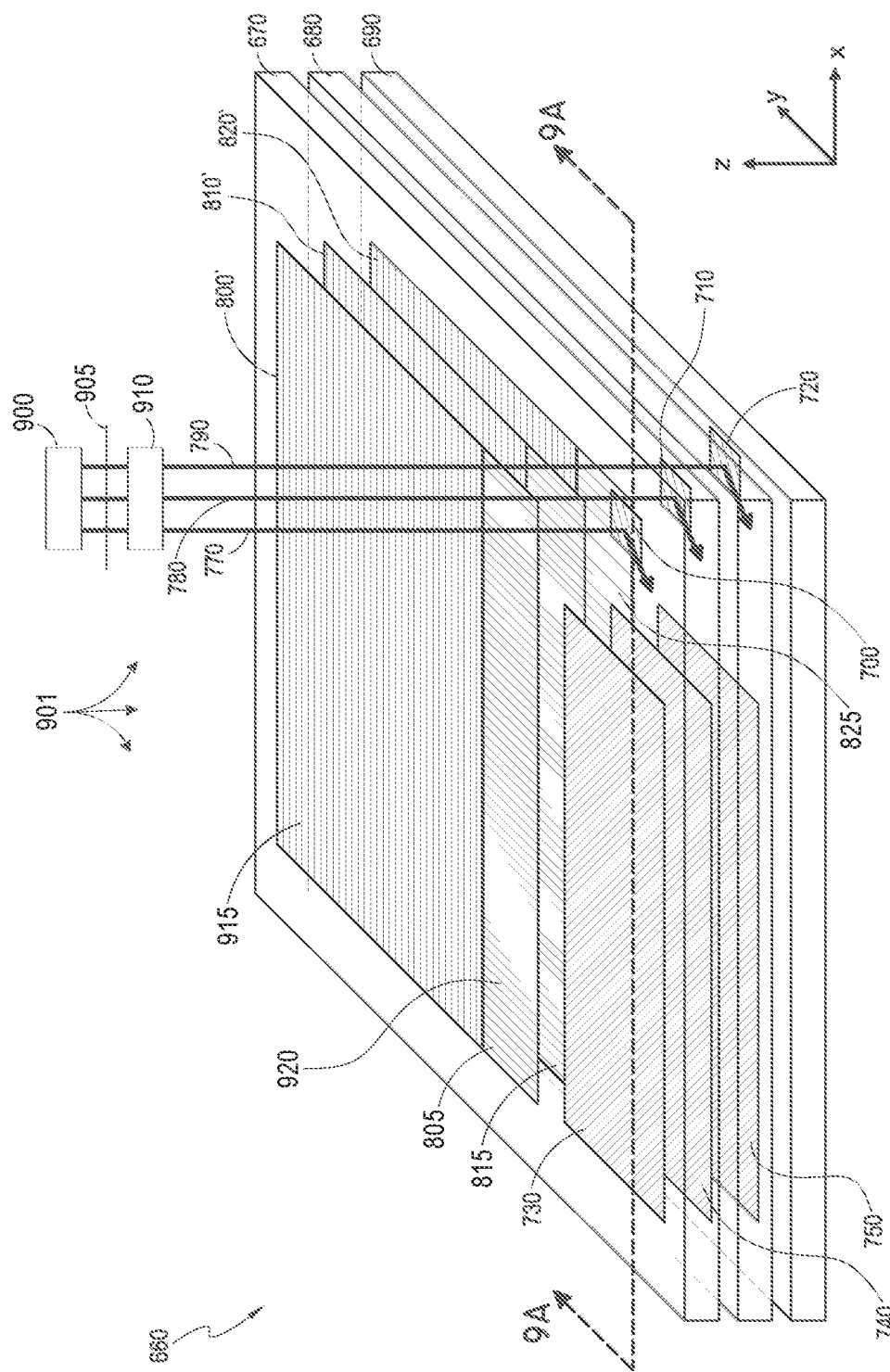
FIG. 11A schematically illustrates a multiplexing system comprising a polarization modulator and respective first and second polarization filters associated with respective first and second regions of the exit pupil expander that are configured to present far image content through the first region while blocking the second region and present near image content through the second region at a different time while blocking the first region by modulating the polarization depending on whether far or near image content is to be presented.

In one example, as depicted in FIG. 11A, the head mounted display further comprises a multiplexing system 901 configured to distribute a first portion of image content such as a first portion of a frame (e.g., video frame) through a first region of the exit pupil expander 800', 810', 820' and a second portion of image content such as a second portion of a frame through a second region of the exit pupil expander 800', 810', 820'. The first portion of the image content may include image content to be presented in the portion of the field of view of the wearer coinciding with the first region of the exit pupil expander 800', 810', 820' while the second portion of the image content may include image content to be presented in the portion of the field of view of the wearer coinciding with the second region 805, 815, 825 of the exit pupil expander 800', 810', 820'. Additionally, the image content presented through the first portion may be projected as if located at a first depth, and the image content presented through the second portion may be projected as if located at a second depth that is different from the first. Accordingly, the second region may have different optical power than the first region. This different optical power may cause the light from the second region to diverge in a manner that is different from the propagation of the light from the first region. In one example, the first region is forward and central while the second region 805, 815, 825 is below the first region and the image content presented through the first region corresponds to far image content while the image content presented through the second region corresponds to near image content.

In the example shown in FIG. 11A, the multiplexing system 901 comprises a polarization modulator (as well as control electronics configured to drive/control the polarization modulation and establish the appropriate timing of the modulation) and respective first and second polarization filters associated with respective first and second regions of the exit pupil expander 800', 810', 820' that are configured to present a first portion of the image content corresponding to first (e.g., far) image content through the first region while blocking the first portion of the image content from exiting the second region 805, 815, 825. Similarly, the multiplexing system 901 is configured to present a second portion of the image content corresponding to second (e.g., near) image content through the second region 805, 815, 825 while blocking the second portion of the image content from exiting the first region. In this example, this multiplexing is accomplished by modulating the polarization using, for example, the control electronics depending on whether the first portion of the image content/first image content (e.g., the far image content) or second portion of the image content/second image content (e.g., the near image content) is to be presented. In particular, sub-regions 805, 815, 825 include a polarizing filter 920 (often referred to herein as the second polarizer) configured to selectively pass light having a second polarization, while the remainder of the EPE's 800', 810', 820' may include a polarizing filter 915 (often referred to herein as the first polarizer) configured to selectively pass light having a first polarization orthogonal or perpendicular to the second polarization passed by the second polarizing filter 920 of the sub-regions 805, 815, 825. Polarizing filters 915, 920 may be included in or integrated with the out-coupling element of each waveguide in the waveguide stack, or may be a single filter located at the exterior eye-facing surface of the EPE's 800', 810', 820'. The polarization filters 915, 920, for example, may comprise polarization gratings that couple light of a particular polarization out of the waveguide. Image content for both the sub-regions 805, 815, 825 and the remainder of the EPE's 800', 810', 820' may be injected into the waveguide stack 660 in a polarization-multiplexed beam. A near component of the polarization-multiplexed beam can include the image content to be displayed in the sub-region 805, 815, 825, and is polarized in the orientation that is selectively passed by the polarizing filter of the sub-region 805, 815, 825. Similarly, a distant component of the polarization-multiplexed beam can include the image content to be displayed in the remainder of the EPE 800', 810', 820', and is polarized in the orientation that is selectively passed by the polarizing filter of the remainder of the EPE 800', 810', 820'. A polarization-multiplexed beam as described herein can be generated, for example, by sending light from a display 900, such as a fiber scanning display described herein, through a polarizer 905 and a polarization modulator 910 to create polarization modulated beams 770, 780, 790. The polarization modulator 910 may comprise, for example, a liquid crystal modulator comprising a liquid crystal layer disposed between electrodes configured to apply a voltage (e.g., from the control electronics) across the liquid crystal layer so as to cause linearly polarized light to rotate. The polarizer 905 can polarize the light providing as an output, for example, linearly polarized light. The polarization modulator can then rotate the polarization (e.g., rotate the polarization angle of linearly polarized light) and thereby modulate the amount of rotation of the polarization. The polarization modulator 910 may thus modulate or change the polarization from a first polarization state or the first polarization corresponding to the polarization that is passed by the first polarization filter 915 and blocked by the second polarization filter 920 to a second polarization state or the second polarization that is passed by the second polarization filter 920 and blocked by the first polarization filter 915. Beams 770, 780, 790 can then be sent into the waveguide stack 660 at in-coupling elements 700, 710, 720 as described herein. When the light is out-coupled at EPEs 800', 810', 820' including sub-regions 805, 815, 825 or the other portions of the EPE's, the light passes through either of the first polarizing filter 915 or the second polarizing filter 920 to selectively project one of the components of the polarization-multiplexed beam (e.g., the first or second portions of the image content corresponding to the far or near image content) to the eye of a viewer.

Figure 11B:
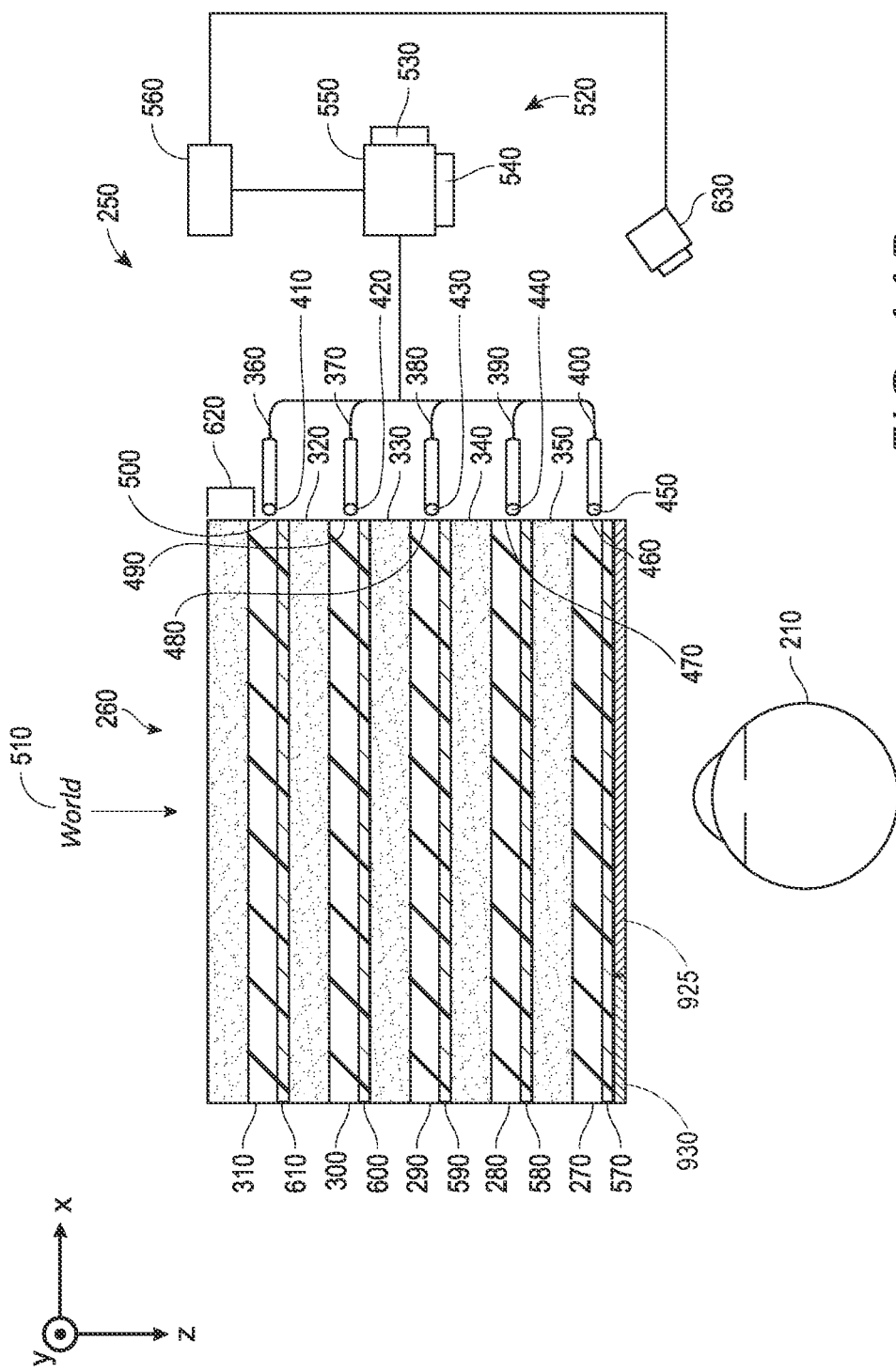
FIG. 11B schematically illustrates another time division multiplexing system comprising first and second shutters associated with first and second regions of the exit pupil expander that are configured to present far image content through the first region while blocking the second region with the second shutter and present near image content through the second region at a different time while blocking the first region with the first shutter.

In another example, as depicted in FIG. 11B, a time division multiplexing system comprising first and second shutters associated with first and second regions of the exit pupil expander that are configured to present far image content through the first region while blocking the second region with the second shutter and present near image content through the second region at a different time while blocking the first region with the first shutter. The time division multiplexing system may include control electronics configured to drive/control the shutters and establish the appropriate timing of the presentation of the different image content from the different regions. Separation of image content between the near and distant regions may be achieved by providing liquid crystal shutters 930, 925 on the sub-region 805, 815, 825 and the remainder of the EPE 800', 810', 820'. Similar to the polarizing filters described above, separately controllable liquid crystal shutters 930, 925 may be provided for each of the regions of the EPE 800', 810', 820'. In the example configuration of FIG. 11B, liquid crystal shutter 930 is coextensive with the sub-region 805, 815, 825, while liquid crystal shutter 925 is coextensive with the remainder of the EPE 800', 810', 820'. The liquid crystal shutters 925, 930 may each comprise liquid crystal layers disposed between electrodes arranged to apply a voltage (e.g., from the control electronics) across the liquid crystal layers. The liquid crystal shutters 925, 930 further may comprise a polarizer and an analyzer (another polarizer). Each liquid crystal film or layer may be controllable by applying a voltage (e.g., from the control electronics) across the film to change the polarization of the film, for example, between two alternate perpendicular orientations. For example, light initially propagates through the polarizer to provide polarized light such as linearly polarized light. The liquid crystal film receives this linearly polarized light. The liquid crystal film may rotate the polarization (e.g., the polarization angle of linearly polarized light) depending on the voltage applied to the liquid crystal film via the electrodes. Accordingly, the linear polarization of the light may be made to be parallel or perpendicular to the linear polarization state that is transmitted by the analyzer. Thus, when distant image content is being displayed, the voltages across the two liquid crystal shutters may be selected such that the out-coupled light in the sub-region 805, 815, 825 is blocked while the out-coupled light in the remainder of the EPE 800', 810', 820' is passed. Similarly, when near image content is being displayed, the voltages across the two liquid crystal shutters may be selected such that the out-coupled light in the sub-region 805, 815, 825 is passed while the out-coupled light in the remainder of the EPE 800', 810', 820' is blocked.

The shutters need not completely block ambient light from the world forward of the wearer and the head mounted display. For example, instead of comprising two polarizers (a polarizer and an analyzer), the shutters may comprise an analyzer and no polarizer preceding the liquid crystal film. Accordingly, un-polarized ambient light from the objects in the environment or world forward of the wearer and the head mounted display may pass through the analyzer regardless of whether the liquid crystal film rotates linearly polarized light or not. In such a design, by contrast, the light from the display may comprise linearly polarized light. For example, the head mounted display device may include a polarizer disposed in the optical path between the display and the in-coupling optical element of the waveguide, or the waveguide itself may include a polarizing element. The in-coupling element may, for example, be polarization selective and thus comprise a polarizer. Such a polarizer or polarizing element may yield linearly polarized light that may be rotated by the liquid crystal film depending on the voltage applied (e.g., from the control electronics) to the liquid crystal film. Accordingly, the liquid crystal film and the analyzer can operate as a shutter for the light from the display that may be selectively open and closed to allow light from the display to pass or be blocked; however, ambient light from objects forward the wearer and the head mounted display may pass through regardless of the state of the shutter. In this manner, when the shutter is closed to light from the display, the user can still see through the eyepiece to the world forward the viewer and the head mounted display.

In a third example, separation of image content between the near and distant regions of the EPE 800', 810', 820' may be achieved by selectively projecting image content to the sub-regions 805, 815, 825 and remainder of the EPE 800', 810', 820' based on a wearer's gaze direction and/or head pose. As illustrated in FIG. 6, the head mounted display device may include an eye tracking camera 630 and/or head pose orientation sensor. Such a head pose orientation sensor may comprise, for example, one or more accelerometers, gyros, motion sensors, GPS components, etc., configured to assist in determining head movement, orientation, and/or position. The head mounted display may also comprise one or more eye tracking cameras 630 and processing electronics configured to determine the wearer's gaze direction. Thus the wearer's gaze direction may be detected by an eye tracking camera 630 configured to determine a gaze direction of the eye 210 and the gaze direction may be used to determine what image content to present. (Alternatively and/or additionally, head pose sensors may provide information regarding the wearer's gaze.) For example, when the wearer's gaze is directed to the sub-region 805, 815, 825, the electronics may cause the display to in-couple light including only the near image content and not the distant image content. If the wearer is looking at the sub-region 805, 815, 825, the wearer will see the near image content at the proper near depth as provided by the sub-region 805, 815, 825. This near image content may be at the lower portion of the frame or field or field of view. The upper portion of the frame or field or field of view may not include image content. Similarly, when the wearer's gaze is directed toward the remainder of the EPE 800', 810', 820', the electronics may cause the display to in-couple light including only the distant image content and not the near image content. If the wearer is looking at the remainder of the EPE 800', 810', 820', the wearer will see the far image content presented at the proper far depth as provided by the remainder of the EPE 800', 810', 820'. The far image content may be in the upper portion of the frame or field or field of view. The lower portion of the frame or field or field of view may not include image content.

Figure 12A:
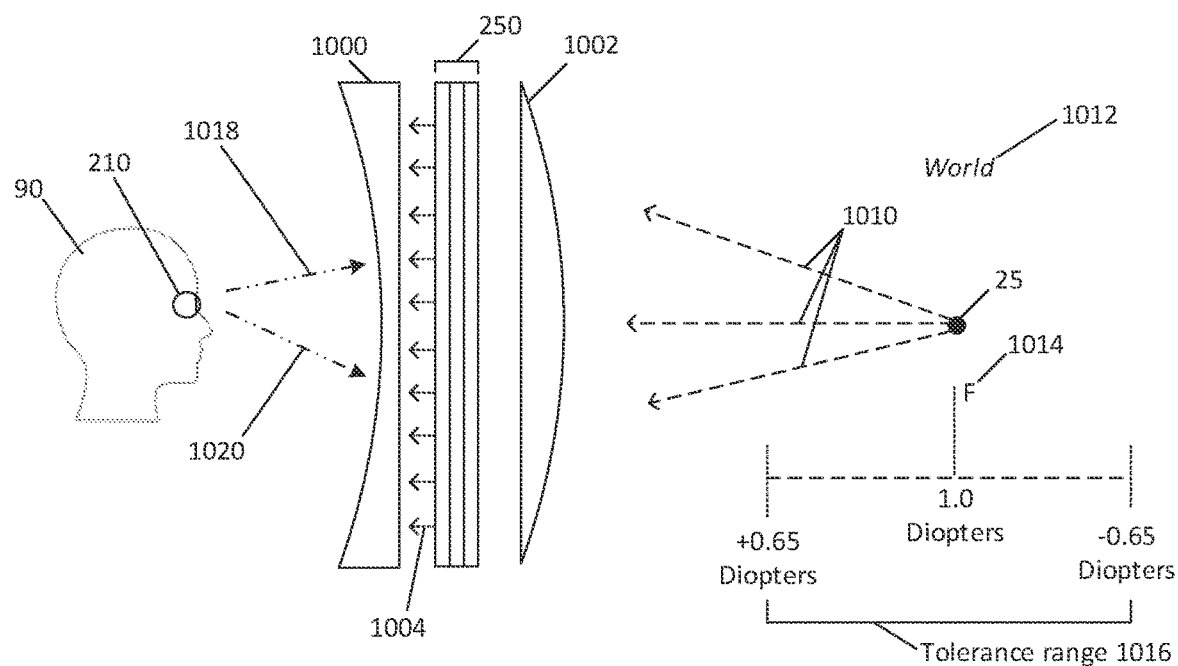
FIG. 12A illustrates aspects of a display configuration featuring a negative lens and a positive lens positioned on either side of a display system, such as one comprising a set of waveguides.
Figure 12B:
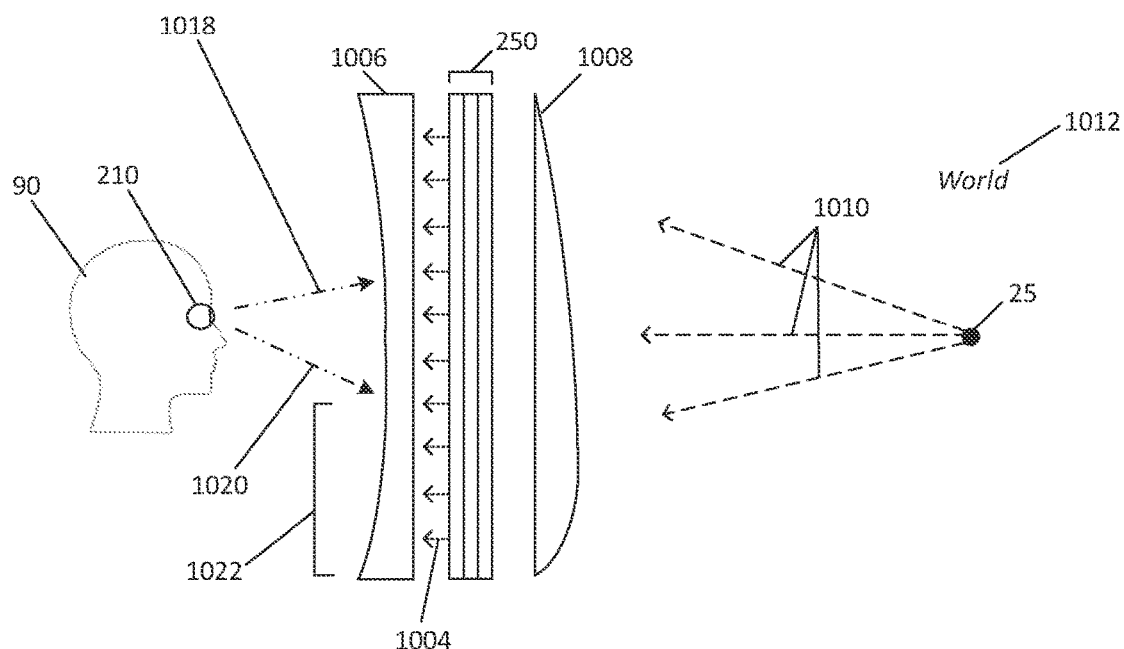
FIG. 12B illustrates certain aspects of display configurations featuring a negative lens and a positive lens positioned on either side of a display system, such as one comprising a set of waveguides, wherein the negative lens comprises a progressive focus lens, and the positive lens comprises a balancing progressive focus lens configured to complement the negative progressive lens.
Figure 12C:
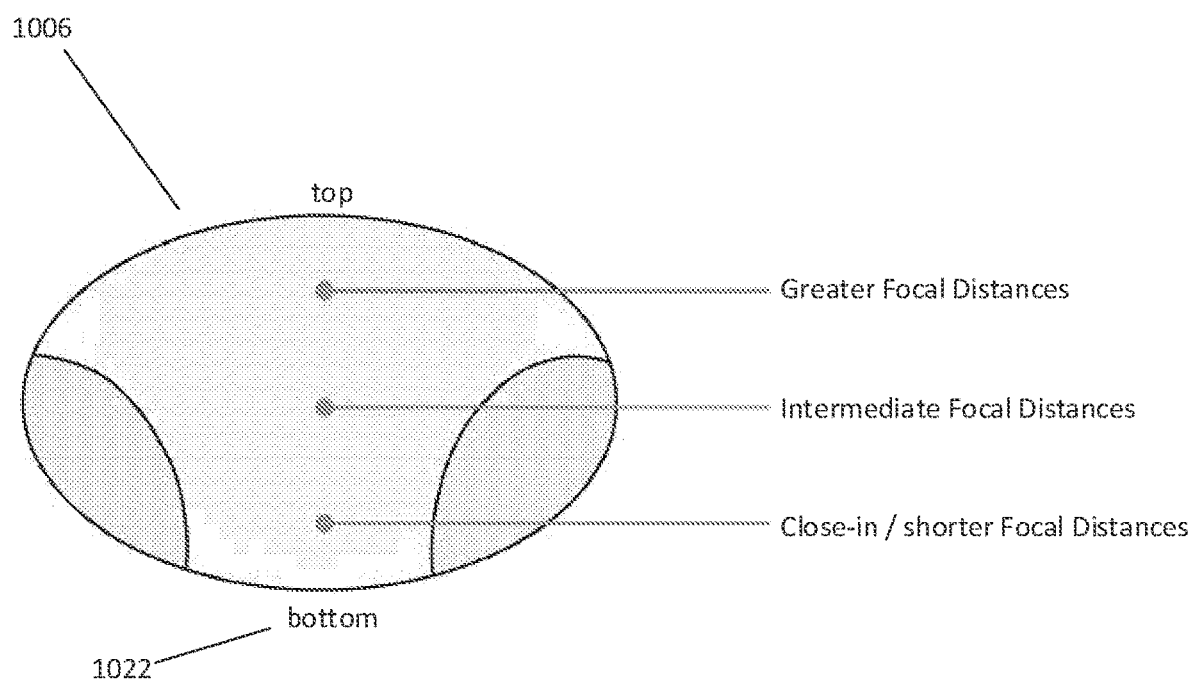
FIG. 12C illustrates certain aspects of an orthogonal view of a typical progressive lens configuration, such as those utilized in eyeglasses.

Referring to FIGS. 12A-12C, in various embodiments, it may be desirable to utilize what may be termed a "progressive" lens configuration to enhance the range of perceived focal depth for various virtual reality content portions. For example, referring to FIG. 12A, an eye (210) of a user (90) is shown oriented toward a display system (250), such as one comprising a set of waveguides; it may, for example, be configured to produce collimated light, or produce light related to virtual reality imagery which has an unadjusted focal distance at infinity) with a set of translucent lenses (1000, 1002) positioned as shown, so that light emitted (1004) from the display system (250) toward the eye (210) passes through the so called "negative" lens (1000) and diverges, to be interpreted by the user's (90) vision center as focused at a focal distance "F" (1014) prescribed by the lens (1000) configuration. Such a configuration may be utilized to have the user (90) interpret a portion of a virtual image element as positioned at the depicted point (25), for example, which in the depicted variation may be at 1.0 diopters. In one embodiment, it may be desirable to only present content with such a lens configuration within a prescribed tolerance range (1016) which is deemed comfortable or useful to the user, such as +/−0.65 diopters from the central focal point (1014), as shown in FIG. 12A. With an embodiment such as that illustrated in FIG. 12A, if it is desired to place virtual content closer or farther from the focal position (1014) dictated by the negative lens (1000), i.e., out of the tolerance range (1016) shown in the depicted variation, a different lens geometry will be desired. As shown in FIG. 12A, a balancing "positive" lens (1002) also is included and matched to complement the negative lens (1000) so that light coming through the entire viewing assembly (1002, 250, 1000) from the real world, such as light (1010) coming from the real world (1012) at the point (25) is interpreted by the user's (90) vision center as being from the correct location in space without alteration (i.e., without a net focal position adjustment) from the viewing assembly (1002, 250, 1000).

Referring to FIG. 12B, an embodiment is illustrated to functionally increase the operating range for virtual content or imagery presentation/perception beyond, for example, an inherently limited tolerance range such as that (1016) associated with the configuration of FIG. 12A. Referring to FIG. 12B, an eye (210) of a user (90) is shown oriented toward a display system (250) configured to direct light (1004) pertaining to virtual imagery and/or content through a "progressive" focus negative lens (1006) toward the eye (210). The progressive negative lens (1006) is configured to have an effective focal distance that varies based upon the gaze vector of the eye through such lens. For example, the progressive focus negative lens may be configured to change focal distance only for gaze vectors that range between straight ahead gaze and vertical down gaze, or from left to right gaze, or various combinations and permutations thereof. For example, FIG. 12C illustrates an orthogonal view of a typical progressive lens configuration similar to those utilized for eyeglasses. Referring back to FIG. 12B, the depicted embodiment of the progressive negative lens (1006) is configured so that: a) gaze vectors that are straight ahead or higher (such as 1018) are generally sent to a relatively fixed focal length, say "F1" or "depth plane 1"; and b) gaze vectors that are below straight ahead (such as 1020) are sent to a different focal length, say "F2" or "depth plane 2", which may be varied depending upon the particular gaze vector. In one embodiment, F2 may be closer to the user than F1. In another embodiment, the position of F2 may be variable with gaze vector; for example, in one embodiment, the position of F2 may be mapped geometrically into the bottom portion (1022) of the progressive negative lens (1006) such that it is positioned increasingly closer to the user as the user gazes more and more downward through the progressive negative lens (1006). As shown in FIG. 12B, a balancing "positive" progressive lens (1008) also is included and matched to complement the negative progressive lens (1006) so that light coming through the entire viewing assembly (1008, 250, 1006) from the real world, such as light (1010) coming from the real world (1012) at the point (25) is interpreted by the user's (90) vision center as being from the correct location in space without alteration (i.e., without a net focal position adjustment) from the viewing assembly (1008, 250, 1006).

In various embodiments, the progressive lens (1006, 1008) optics may be configured to provide an enhanced net operating range for the display system, with additional range made available to the user by a change of viewing vector. For example, in one embodiment, the progressive lens (1006, 1008) optics may be configured to provide an F1 of about 0.66 diopters (with an acceptable tolerance range of about +/−0.65 diopters), and an F2 of about 1.5 diopters (with an acceptable tolerance range of about +/−0.65 diopters), thus providing a relatively broad overall functional range, accessible by an adjustment of eye gaze vector. The associated AR and/or VR head-mounted display system may be configured to automatically detect changes in eye gaze vector based upon image analysis of the eye (i.e., with inward-facing cameras), and/or by associated sensors, such as one or more accelerometers, gyros, or inertial measurement unit ("IMU") subsystems which may be coupled to the user's cranium by virtue of the head-mounted display housing. In other embodiment, a user may be able to use a user interface to controllably toggle between virtual content/ imagery presentation at F1 vs F2, such as via a pushbutton or voice command. For example, it may be desirable in various gaming or other configurations to have a control panel or other display portion located virtually in a position that is low and close to the user—as compared with other content of the game, for example. With such a configuration, in one variation the system may be configured to switch to the F2 focal plane when a head-coupled IMU detects a chin-rising roll of the head or jaw past a certain threshold; in another variation the system may be configured to switch to the F2 focal plane when a downward gaze vector, past a certain downward threshold, is detected; in another variation the system may be configured to switch to the F2 focal plane when the user presses a certain button assigned to F2, or uses a voice command associated with F2 (such as "control panel"); in other variations, a system may be configured to switch between focal planes using combinations and permutations of head rotation, jaw rotation, eye gaze vector, and/or physical and/or voice user interface commands. For example, in one embodiment which may be user configurable, the user may require the system to only switch to F2 when he either executes a voice command (such as "control panel") or combines eye and head rotation past prescribed thresholds, as detected, for example, by head coupled IMU and eye-oriented cameras; and the user may prescribe that the system only switch back to F1 from F2 when the user executes a voice command (such as "deep"). As noted above, a progressive negative lens (1006) may configured to have an effective focal distance that varies based upon the gaze vector of the eye through such lens.

Figure 10E:
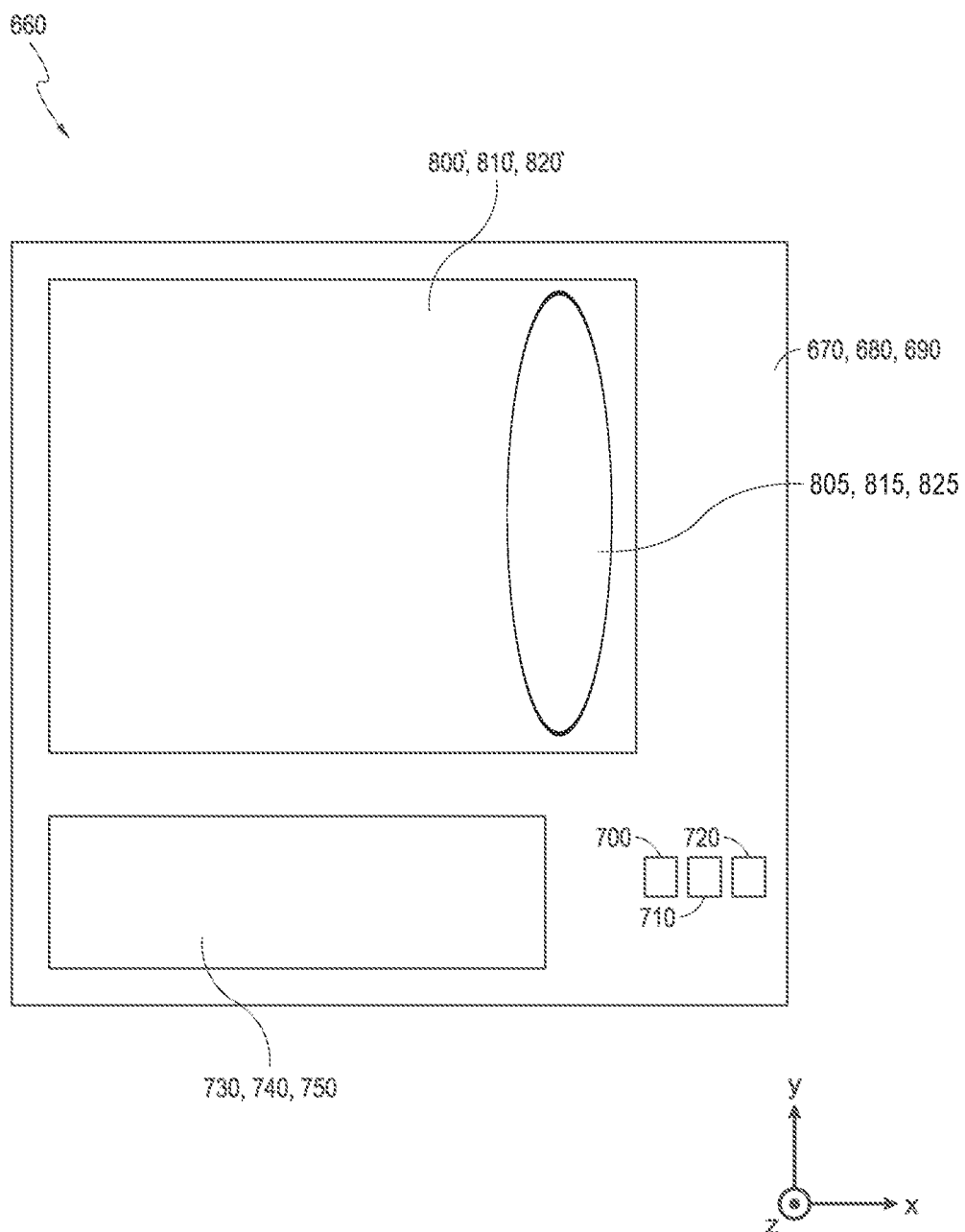

While the aforementioned embodiment pertains to a configuration wherein the effective focal distance for presented virtual content and/or imagery is configured to change, in accordance with the pertinent lens optics as described above and shown in FIGS. 12B and 12C, as the gaze vector is adjusted downward (i.e., referring to an axis configuration such as that shown in FIG. 10E, wherein the Z axis is approximately parallel to the user standing straight up and gazing straight forward toward a horizon, with the X axis being orthogonally horizontal and the Y axis being orthogonally vertical, adjusting the gaze vector "downward" would be akin to adjusting gaze from a vector that may be approximately parallel to the Z axis or even above parallel the Z axis (as in the depicted gaze vector 1018 of FIG. 12B) to one that is below parallel to the Z axis (as in the depicted gaze vector 1020 of FIG. 12B); in other words, the progressive optics of the configuration of FIGS. 12B and 12C are configured to predictably change focal distance with gaze vector realignments that are downward toward the bottom half of the progressive negative lens (1006)), it is important to note that the progressive optics may alternatively be configured to predictably change focal distance with gaze vector realignments in any direction in which gaze may be aligned. For example, in one embodiment, the progressive optics may be configured to predictably change focal distance with gaze vector realignment directly horizontal to the left, such as by having a configuration such as that shown in FIG. 12B, but having the entire viewing assembly (1008, 250, 1006) rotated about the Z axis by 90 degrees so that the bottom portion (1022) of the progressive negative lens (1006) is positioned directly left as the user gazes straight left from a previous alignment with the Z axis straight out through the viewing assembly (1008, 250, 1006). Similar embodiments may be configured to predictably change focal distance with gaze vector realignment to the right, or to the top, or to the upper-left, upper-right, lower-left, lower-right, and so on.

For instance, the progressive focus negative lens may be configured to change focal distance for gaze vectors that range from a left to right gaze (e.g., a direction inward towards the user's nose to a direction outward away from the user's nose). As an example, a progressive negative lens can be configured so that: a) gaze vectors that are straight ahead and/or outward (e.g., away from the user's nose) or are generally sent to a relatively fixed focal length, say "F1" or "depth plane 1"; and b) inward gaze vectors (e.g., vectors angled towards the user's nose) are sent to a different focal length, say "F2" or "depth plane 2", which may be varied depending upon the particular gaze vector. In one embodiment, F2 may be closer to the user than F1. In another embodiment, the position of F2 may be variable with gaze vector; for example, in one embodiment, the position of F2 may be mapped geometrically into an inward portion 1024 of the progressive negative lens (e.g., the portion the lens nearer to the user's nose, as shown in FIG. 12C) such that it is positioned increasingly closer to the user as the user gazes more and more inward (e.g., towards his noise) through the progressive negative lens. This can be beneficial, for example, in accommodating vergence movements of a user's eyes when viewing subjects that are perceived to be closer to the user.

In some embodiments, the system may be configured to project a combination of both near and distant image content. For example, a wearer may be looking at distant image content, which is in the upper portion of the frame or field or field of view (or EPE 800', 810', 820'), when the wearer receives image content more suitable for viewing at a near depth such as an email, text, etc. If the email is generally displayed as near image content, the display may notify the wearer by simultaneously displaying both the existing distant image content and the email content. The wearer may then see the email content, which will appear distant, for example, due to the optical power of the remainder of the EPE 800', 810', 820', and may thereby be prompted to look down to the sub-region 805, 815, 825. The eye tracking may detect this movement of the eye downward and may cause the display to present the email content alone without the distant image content. The wearer gazing, downward, will see the e-mail through the sub-region 805, 815, 825 and thus the e-mail will appear to be nearer because of the optical power associated with the sub-region 805, 815, 825. The e-mail (or other image content more suitable for viewing at a near depth plane) can thus be viewed in detail.

It is contemplated that the innovative aspects may be implemented in or associated with a variety of applications and thus includes a wide range of variation. Variations, for example, in the shape, number, and/or optical power of the EPE's are contemplated. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the proper orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. An eyepiece for a head-mounted display device, the eyepiece comprising:
   a first progressive optical lens comprising:
      a first region having a first optical power, and
      a second region having a second optical power different from the first optical power, and
   a second progressive optical lens comprising:
      a third region having a third optical power, and
      a fourth region having a fourth optical power,
      wherein the third optical power is an inverse of the first optical power and the fourth optical power is an inverse of the second optical power, and
   wherein the eyepiece is configured, during operation of the head-mounted display device, to:
      receive light from a light projector,
      direct at least a first portion of the light to a user's eye through the first region of the first progressive optical lens to present a first virtual image to the user at a first focal distance, such that the first virtual image is overlaid with the user's environment, and
      direct at least a second portion of the light to the user's eye through the second region of the first progressive optical lens to present a second virtual image to the user at a second focal distance different from the first focal distance, such that the second virtual image is overlaid with the user's environment.

2. The eyepiece of claim 1, wherein the first progressive optical lens and the second progressive optical lens are aligned such that the first region of the first progressive optical lens at least partially overlaps with the third region of the second progressive optical lens.

3. The eyepiece of claim 2, wherein the first progressive optical lens and the second progressive optical lens are aligned such that the second region of the first progressive optical lens at least partially overlaps with the fourth region of the second progressive optical lens.

4. The eyepiece of claim 1, wherein the eyepiece is configured, during operation of the head-mounted display device, to:
   receive ambient light from the user's environment,
   direct at least a first portion of the ambient light to the user's eye through the third region of the second progressive optical lens and the first region of the first progressive optical lens, and
   direct at least a second portion of the ambient light to the user's eye through the fourth region of the second progressive optical lens and the second region of the first progressive optical lens.

5. The eyepiece of claim 4, wherein the ambient light comprises light from an object positioned in the user's environment.

6. The eyepiece of claim 1, wherein the first progressive optical lens is a negative optical lens.

7. The eyepiece of claim 6, wherein the second progressive optical lens is a positive optical lens.

8. The eyepiece of claim 1, wherein the eyepiece is configured such that, when the head-mounted display device is worn by the user, the first region of the first progressive optical lens corresponds to a first range of gaze vectors of an eye of the user.

9. The eyepiece of claim 8, wherein the eyepiece is configured such that, when the head-mounted display device is worn by the user, the second region of the first progressive optical lens corresponds to a second range of gaze vectors of the eye of the user, wherein the first range of gaze vectors is different from the second range of gaze vectors.

10. The eyepiece of claim 9, wherein the first range of gaze vectors comprises a first gaze vector extending in a straight ahead direction from the eye of the user.

11. The eyepiece of claim 10, wherein the second range of gaze vectors comprises a second gaze vector extending in a vertically downward direction from the eye of the user.

12. The eyepiece of claim 1, wherein the first progressive optical lens further comprises:
one or more additional regions having an additional optical power different from the first optical power and the second optical power.

13. The eyepiece of claim 12, wherein the first progressive optical lens comprises two additional regions disposed on respective opposing sides of the first progressive optical lens, the two additional regions having an additional optical power different from the first optical power and the second optical power.

14. The eyepiece of claim 1, further comprising at least one of a diffractive optical element or a holographic optical element.

15. The eyepiece of claim 1, further comprising at least one of an analog surface relief grating (ASR), a binary surface relief structure (BSR), or a switchable diffractive optical element.

16. A head-mounted display device comprising:
the eyepiece of claim 1; and
the light projector of claim 1.

17. An eyepiece for a head-mounted display device, the eyepiece comprising:
a first progressive optical lens comprising:
a first region having a first optical power, and
a second region having a second optical power different from the first optical power, and
a first polarizing filter and a second polarizing filter,
wherein the first polarizing filter is configured to prevent at least some light from the first region of first progressive lens from being emitted, and
wherein the second polarizing filter is configured to prevent at least some light from the second region of first progressive lens from being emitted, and
wherein the eyepiece is configured, during operation of the head-mounted display device, to:
receive light from a light projector,
direct at least a first portion of the light from the light projector to a user's eye through the first region of the first progressive optical lens to present a first virtual image to the user at a first focal distance, such that the first virtual image is overlaid with the user's environment, and
direct at least a second portion of the light to the user's eye through the second region of the first progressive optical lens to present a second virtual image to the user at a second focal distance different from the first focal distance, such that the second virtual image is overlaid with the user's environment.

18. The eyepiece of claim 17, wherein the first region and the second region of the first progressive optical lens are separated by a boundary, and the first optical power transitions discretely to the second optical power across the boundary.

19. The eyepiece of claim 17, wherein the first progressive optical lens comprises a fifth region arranged between the first region and the second region and an optical power of the fifth region continuously transitions from the first optical power to the second optical power in a direction from the first region to the second region of the first progressive optical lens.

* * * * *